United States Patent

Moore et al.

(10) Patent No.: US 7,924,395 B2
(45) Date of Patent: Apr. 12, 2011

(54) METHOD AND SYSTEM FOR DELIVERING DIGITAL CINEMA CONTENT CONCURRENTLY TO BOTH A RETAIL EXHIBITOR AND REMOTE THEATER

(75) Inventors: Leslie G. Moore, Webster, NY (US); Verlyn Belisle, Fairport, NY (US); Robert Mayson, Marsworth (GB); Richard C. Sehlin, Rochester, NY (US); Mark P. Henry, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 1126 days.

(21) Appl. No.: 11/622,809

(22) Filed: Jan. 12, 2007

(65) Prior Publication Data

US 2007/0171374 A1 Jul. 26, 2007

Related U.S. Application Data

(60) Provisional application No. 60/758,916, filed on Jan. 13, 2006.

(51) Int. Cl.
*G03B 21/32* (2006.01)

(52) U.S. Cl. ............................. 352/40; 725/5; 725/109

(58) Field of Classification Search .................... 352/40; 725/62, 63, 105, 5, 109, 118, 119
See application file for complete search history.

(56) References Cited

U.S. PATENT DOCUMENTS

| | | | | |
|---|---|---|---|---|
| 5,715,400 | A * | 2/1998 | Reimer et al. | 705/27 |
| 6,141,530 | A * | 10/2000 | Rabowsky | 725/116 |
| 6,525,801 | B1 * | 2/2003 | Matsuzawa et al. | 352/40 |
| 6,700,640 | B2 * | 3/2004 | Morley et al. | 352/40 |
| 7,168,086 | B1 * | 1/2007 | Carpenter et al. | 725/98 |
| 7,574,725 | B2 * | 8/2009 | Stiliadis | 725/91 |
| 2002/0112243 | A1 * | 8/2002 | Hunter et al. | 725/92 |
| 2004/0064837 | A1 * | 4/2004 | Kitadai et al. | 725/104 |
| 2004/0109137 | A1 * | 6/2004 | Bubie et al. | 352/40 |
| 2005/0168693 | A1 * | 8/2005 | Mizer et al. | 352/40 |
| 2006/0015927 | A1 * | 1/2006 | Antonellis et al. | 725/145 |
| 2007/0220575 | A1 * | 9/2007 | Cooper et al. | 725/118 |
| 2008/0147503 | A1 * | 6/2008 | Brooks | 705/14 |
| 2008/0168515 | A1 * | 7/2008 | Benson et al. | 725/110 |
| 2009/0112676 | A1 * | 4/2009 | Reich et al. | 705/8 |
| 2009/0144542 | A1 * | 6/2009 | Wetmore et al. | 713/156 |
| 2009/0185684 | A1 * | 7/2009 | Antonellis et al. | 380/210 |

OTHER PUBLICATIONS

"Is Mark Cuban Missing the Big Picture?" by Randall Stross, The New York Times, Sunday, Dec. 18, 2005 "Inside the News".
"Movies May Hit DVD, Cable Simultaneously", by Sarah McBride, Peter Grant, and Merissa Mar, The Wall Street Journal, Marketplace section, Jan. 4, 2006.

* cited by examiner

*Primary Examiner* — William C Dowling
(74) *Attorney, Agent, or Firm* — Stephen H. Shaw; Kevin E. Spaulding

(57) ABSTRACT

A method for delivering digital cinema concurrently to a retail exhibitor and a remote theater that includes forming a digital cinema right-to-distribute contract between a content owner and a retail exhibitor. In addition, a digital cinema movie rental contract is formed between the retail exhibitor and a remote theater user. Newly released digital cinema content is delivered both to the remote theater and to the retail exhibitor. Display of the newly released digital cinema content occurs at the remote theater as early as the display of the newly released digital cinema content at the retail exhibitor.

12 Claims, 22 Drawing Sheets

_US 7,924,395 B2_

METHOD AND SYSTEM FOR DELIVERING DIGITAL CINEMA CONTENT CONCURRENTLY TO BOTH A RETAIL EXHIBITOR AND REMOTE THEATER

CROSS-REFERENCE TO RELATED APPLICATION

Reference is made to and priority claimed from U.S. Provisional Application Ser. No. 60/758,916, filed 13 Jan. 2006, entitled "Delivering Digital Cinema Concurrently to a Retail Exhibitor and a Home Theater Environment."

FIELD OF THE INVENTION

The present invention relates to concurrent delivery of digital cinema content to a retail exhibitor and a location remote from the retail exhibitor. More specifically, the present invention provides newly released day and date digital cinema content to both a retail exhibitor and a location remote from the retail exhibitor. In yet greater specificity, the present invention provides a method for delivering a day and date release viewing of digital cinema to a consumer off-site from a retail theater, while coinciding with the cinema premier at the retail theater. The present invention includes a method for managing at the retail theater's site customized marketing, selling, ordering, scheduling, secure delivery, and the display and viewing experience, at the remote site of the customer, of "Day and Date" releases, associated advertising, promotional material and other content.

BACKGROUND OF THE INVENTION

Today's motion picture industry is primarily structured to release movie content through motion picture retail exhibitors that own theaters or cinema houses (referred to in the figures as "Exhibitors"). The movie content or cinema is leased by the retail exhibitor, from the content owner, for showing in the retail exhibitor's theaters.

The term "day and date" used herein refers to the simultaneous release of the movie content (also interchangeably referred to as "cinema") to a wide number of theaters and associated cinema screens on the same day. Exclusive distribution of day and date movies or cinema provides a first run market advantage to the retail exhibitor and also aids in marketing the movie/cinema for subsequent sales in other forms or formats.

The time between the retail theater's showing of the cinema—and the wider "follow on market" distribution of the movie is called the "window". The content owners have "follow on market" sales subsequent to the retail theater sales that occur during the "window". These "follow on market" sales by the content owners occur 60-90 days after the cinema leaves the theater. These sales are through multiple sources including, pay television channels such as Home Box Office (HBO™), Cinemax™, Showtime™, The Movie Channel™, Encore™, through pay-per view, through DVD sales and rental, for example, at Blockbuster™, Hollywood Video™, Netflix™, ClickStar™ and alternate venues such as airline movies. Later in the cinema content sell cycle, the motion picture will be distributed to broadcast television owners. These sales are exclusively from the content owner to the follow on market distributor. Retail exhibitors are not part of these transactions; therefore, the retail exhibitor gains no revenue from the follow on sales of the movie content that was first widely distributed in the retail exhibitor's theaters. Thus, where a movie is popular in theaters the continuing popularity doesn't yield continuous revenue to the retail exhibitor. Nor does a movie introduced to the public initially in select theaters, but becomes popular near or at the end of the "window" reap the retail exhibitor continued profit during subsequent DVD sales due to a late, but popular appreciation of the cinema content.

In FIG. 1, release cycle method 110 describes a conventional release cycle for a typical motion picture. The conventional release cycle of a movie includes an exhibitor 111, DVD&VHS rental 112, DVD sales 113, Pay per View sales 114, and airing on Broadcast Television 115. The release cycle is entirely controlled by the content owner. Only one viewing option is available for the consumer during the "window", and that is to see the movie at the retail theater. The release cycle begins with release to contracted theaters, shown here as exhibitor 111; followed by release to rental stores, shown as DVD&VHS rental 112, followed by DVD sales 113, subsequently followed in time by pay per view sales 114, and finally to broadcast television 115. This release cycle has the advantage of providing multiple opportunities for the content owner to sell their product without creating sales channel conflicts. That is, for a given date in time, the consumer does not have the option to choose between seeing the movie at the theater versus buying or renting the DVD. Thus, the consumer's viewing choices are restricted according to specific calendar days that will govern the release of the movie product on certain media in certain outlets. In general, the viewing market is segmented in time and by the unique media types available at each point in time, first a motion picture 35 mm film, followed by DVD, or VSH tape, or Internet broadband downloads, or a digital cable or satellite feed, and finally terrestrial analog broadcast of the motion picture.

Retail exhibitors fervently desire to protect the "window" so that consumers will attend the theater to see the first run movies, and purchase concessions, which is a significant source or earnings and revenue for the theater owner. Stringent protection of the "window" is believed to be vital for the financial viability of the theater owners. Notably, the theater owner does not benefit from sales into the follow on markets.

In contrast, content owners merely respect the "window" due to the revenue garnered from exhibition and the marketing advantage it provides for follow on market sales. Nevertheless, most films do not make a full return on the studio production company's investment from domestic box office revenues. The revenue received from the "follow on markets" is steadily increasing as a proportion of the total revenue generated by the studio production company's film releases. This is at least in part driven by the increasing quality of the in-home experience enabled by the advent of the Home Theater System. In fact, the majority of income from a movie now comes from the follow on market sales—that is the release to DVD, pay per view etc. In sharp contrast to the retail exhibitors, the content owners collect revenue for sales at every point in the sales life cycle of the movie. This fact encourages content owners to shorten the "window" in order to recognize this growing source of revenue earlier in the life cycle of the movie. However, a shortened "window" is detrimental to the retail exhibitor.

In recognition of the growing phenomenon of home theaters, recent proposed changes to the release cycle have arisen. One such release cycle change was proposed by Mark Cuban, owner of Landmark Theaters™, and also a content owner as a result of his ownership of a small independent film studio, 2929 Entertainment™, has proposed the model shown in release cycle 120. The Cuban motion picture release cycle 120 includes the sales markets of exhibitors 121, DVD&VHS rental 122, DVD Sales 123, Pay per View 124, and Broadcast Television 125. Cuban's model provides "day and date" simultaneous release of the movie to exhibition 121 and to rental 122 or sales of DVD 123, as well as simultaneous release to pay per view 124, with only broadcast television having to wait to display the motion picture. The Cuban release cycle and others that have been proposed all have the limitation of disenfranchising the retail exhibitors or at least taking away a significant portion of their customers. At least some retail exhibitors would charge higher ticket and concession prices, while other retail exhibitors might close theaters. Ultimately, for those consumers who enjoy a traditional retail theater, it would become more difficult and expensive for the consumer to have access to the theater experience. Many traditional retail theater owners have reacted strongly against the Cuban concept, because they aren't simultaneous retail exhibitor and content owners. Therefore, traditional retail exhibitors would not reap revenue in this business model. Instead, the traditional retail exhibitor would lose revenue, because display of the movie at the retail exhibitor's site becomes drastically reduced. Consequently, the all-important concession revenue, based on customer foot-traffic at the retail exhibitor's cinema site, is drastically cut.

Alternative release cycle proposals are described in alternative release cycles 130 and 140. Included in FIG. 130 are the sales markets of exhibitors 131, DVD&VHS rental 132, DVD Sales 133, Pay per View 134, and Broadcast Television 135. Alternative release cycle 130 shows a pay-per-view option 134 offered simultaneously with the release of the movie at the retail theater by exhibitor 131. Release cycle proposal 130, provides an opportunity for additional motion picture sales early in the life cycle of the movie. However, this structured release cycle produces a channel conflict whereby the content owner is selling pay per view options simultaneously with the retail exhibitor offering ticket sales for theatrical viewing of the movie at the retail theater. Again, the retail exhibitor is shut out of revenue for the pay per view and the traditional revenue resulting from display of the movie at the retail exhibitor's cinema site is drastically reduced, because concession revenue based on customer foot-traffic at the retail exhibitor's cinema site is drastically cut.

Alternative release cycle 140 shows a hybrid approach involving the sales markets of exhibitors 141, DVD&VHS rental 142, DVD Sales 143, Pay per View 144, and Broadcast Television 145. In release cycle 140, Pay per View 144 is offered simultaneously with DVD sales 143. Such an arrangement can be conducted over the Internet should a customer have broadband capability. Accordingly, the content owner manages the release of both digital media types without impacting the traditional "window".

There is a need; therefore, for an improved cinema release cycle that fosters increased sales for retail exhibitors, while providing additional viewing options for cinema consumers.

SUMMARY OF THE INVENTION

The aforementioned need is met by the present invention, which provides a method for delivering digital cinema concurrently to a retail exhibitor and a remote theater, including:

a. forming a digital cinema right-to-distribute contract between a content owner and a retail exhibitor;

b. forming a digital cinema movie rental contract between the retail exhibitor and a remote theater user;

c. delivering newly released digital cinema content to the remote theater and to the retail exhibitor; and d. enabling display of the newly released digital cinema content at the remote theater as early as the display of the newly released digital cinema content at the retail exhibitor.

Another aspect of the present invention provides a system for delivering digital cinema concurrently to a retail exhibitor and a remote theater. Accordingly, a digital cinema content owner owns and provides digital cinema content for retail distribution. A retail digital cinema exhibitor receives the digital cinema content from the digital cinema content owner, whereupon the retail digital cinema exhibitor displays the digital cinema content to on-site retail customers and distributes the digital cinema content for remote use. A remote theater user receives the digital cinema content from the retail digital cinema exhibitor for display on the remote theater user's audio/visual equipment. Finally, an operations center networks the digital cinema content owner and the retail digital cinema exhibitor together, and also networks the retail digital cinema exhibitor with the remote theater user.

A third aspect of the present invention provides an operations center for managing coincident release of digital cinema content both at a retail exhibitor's theater and a remote theater by having:

a. a database that aggregates customer data;

b. a security manager that provides digital assets management, key generation, and delivery of digital cinema content;

c. a back-office and billing system that coordinates financial and legal transactions between a retail exhibitor and a digital cinema content owner, and between the retail exhibitor and a remote theater user; and d. application servers that provide portals for the financial and legal transactions involving the digital cinema content owner, the retail exhibitor, and the remote user.

Finally, the present invention provides a method for delivering digital cinema content concurrently to both a retail exhibitor and a remote theater for concurrent exhibition of the digital cinema content at both locales. Digital cinema content is packaged for concurrent distribution to the retail exhibitor and the remote theater. The digital cinema content is sent to a server at the retail exhibitor, wherein the retail exhibitor displays the digital cinema content at a retail exhibition location. Simultaneously the digital cinema content is delivered to the remote theater, from the retail exhibitor's server, in response to a digital cinema content order selection from the remote theater over a communications network, wherein the remote theater displays the digital cinema content at a remote location as early as the date the retail exhibitor displays the digital cinema content at the retail exhibition location.

ADVANTAGES

The present invention has the advantage that it enables expansion of the cinema viewing market, while providing newly released cinema and cinema-related products to off-site retail customers without severing the traditional business relationship between content owners and exhibitors.

DETAILED DESCRIPTION OF THE INVENTION

This invention describes a system and means for resolving the potential channel conflict while providing an additional product opportunity for content owners, exhibitors and consumers. The invention provides a system and means for customer relationship management in the context of the new business model. Where possible similar labels are employed for the same components or entities throughout the various figures.

Channel conflicts would arise between the content owner and retail exhibitor, if the content owner were to simultaneously offer off-site or remote theater release of first run movies (i.e., "day and date") coincident with the theatrical release of the same first run movie by the retail exhibitor. The channel conflict forces consumers to choose between attending the first run movie or cinema at the retail theater by purchasing tickets and concessions from the retail exhibitor versus purchase of the movie/cinema from the content owner (usually a movie studio) for viewing at remote sites, like a consumer's home. In order to resolve this conflict the present invention provides a system and method for extending the retail theater multi-plex to include remote sites, such as home theater screens in addition to those in the retail theater. Movie ticket sales for retail theatrical viewing, as well as for home theater viewing are purchased from the retail exhibitor. This common point of sale for both viewing venues enables the retail exhibitor to manage the sales during the retail theatrical release window (wherein the first run movie/cinema is released for retail exhibition), hence addressing the concerns over channel conflict.

Figure 1:
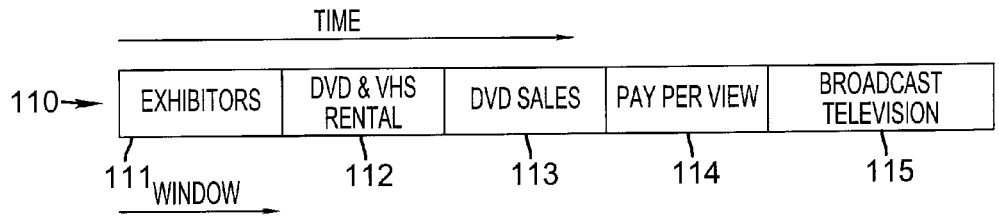
FIG. 1 illustrates several prior art motion picture release cycle methods.
Figure 1:
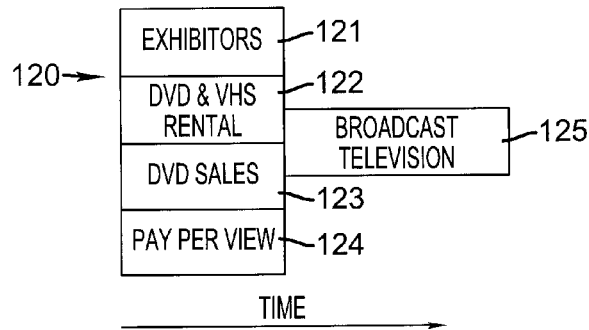
Figure 1:
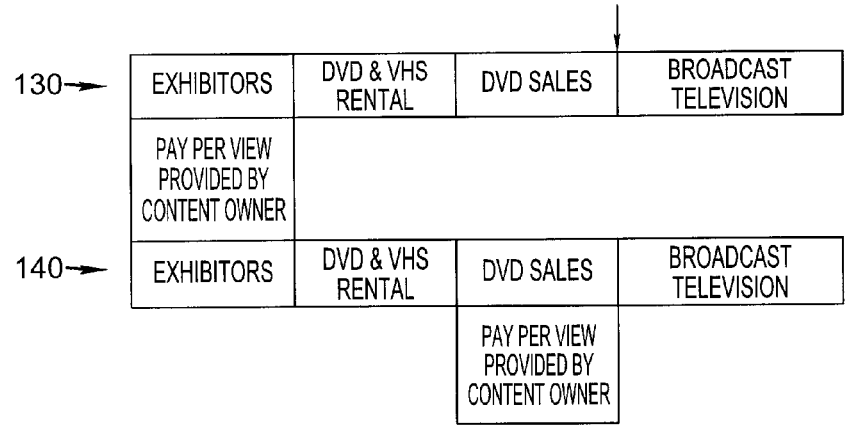
Figure 2:
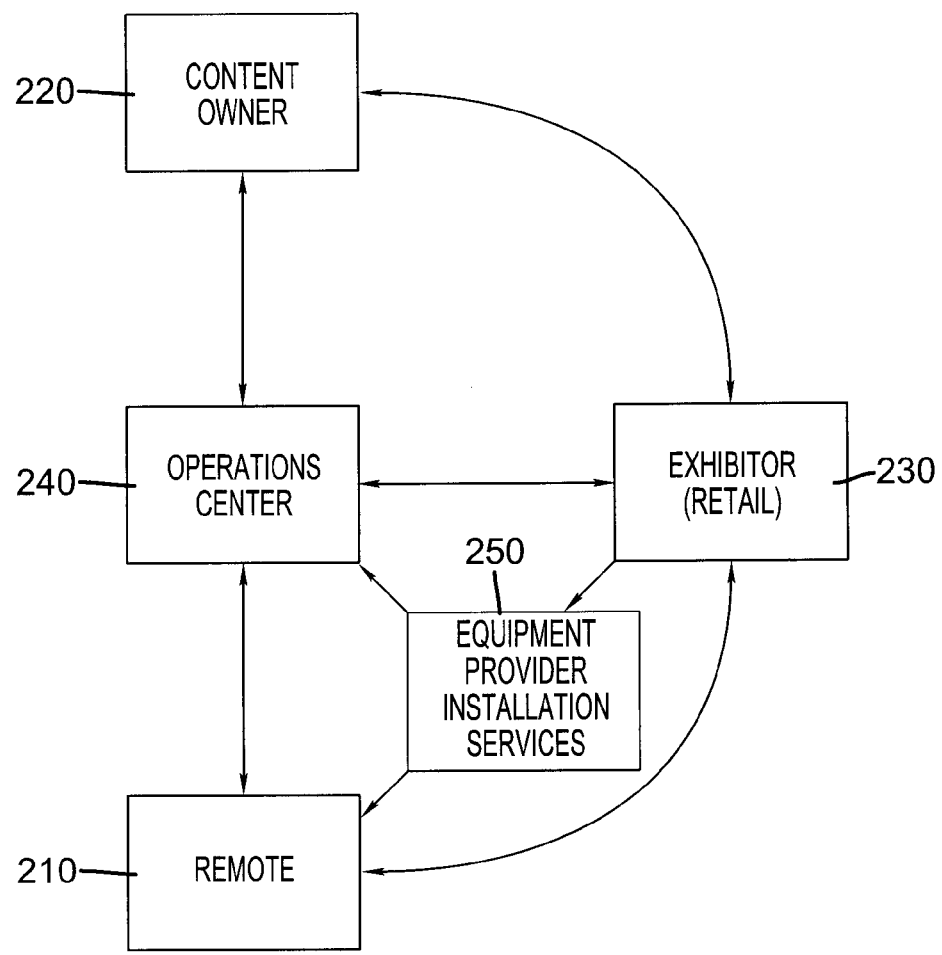
FIG. 2 illustrates a an exemplary high-level overview of the major elements for the present invention.

FIG. 2 illustrates an exemplary high-level overview of the major elements, as well as the business partners, included in the remote theater exhibition system 200. Block 210 denotes the remote theater owner and the equipment and services used by the same. Block 220 denotes the rights owner of motion picture/cinema and other video content. Block 230 denotes the retail exhibitor of the motion picture. Block 240 denotes a central operations center for managing business transactions between the other contractual entities. Block 250 denotes a business entity that provides remote theater equipment and installation services for the remote theater owner 210 on behalf of retail exhibitor 230, for example to consumer's homes to network their home theater equipment. In an alternative embodiment, the retail exhibitor 230 and the remote theater equipment and installation provider 250 are one entity.

The remote theater equipment system 210 is used for selection and ordering of movies as well as for secure playback of movies. The remote theater equipment will have various attributes that are descriptive of viewers at the remote site, including viewer preference and viewer's equipment. The retail exhibitor 230 maintains an end consumer sales relationship and is the point of sale in-theater movie sales as well as for the remote theater owner, for both provision of the day and date service equipment, as well as for delivery of the content and concessions to the remote theater owner.

The customers and suppliers in this business include the equipment provider 250, operations center service provider 240, the retail exhibitor 230, the content owner 220, installation & maintenance provider 250, and the remote theater viewer (not shown in FIG. 2), which may or may not actually own the remote theater 210. The content owner 220 and the retail exhibitor 230 define the terms for release of the motion picture to the cinema screens, under the direction of the retail exhibitor 230. The cinema screens are defined as those within the retail theater complex, as well as those associated with a network of remote theaters. Legal and financial business transactions between the content owner 220 and the retail exhibitor 230 dictates the release of the cinema content, as well as defining the business arrangement for distribution of the cinema to the remote site theater user at remote theater 210. Thus the retail exhibitor 230 and content owner 220 relationship, and the retail exhibitor 230 and end consumer relationship is maintained, while providing for "day and date" release of the cinema to the remote theater 210, where additional end consumers are located.

Operations center 240, in FIG. 2, provides for customer relations management, associated web portal management for the content owner 220, the retail exhibitor 230 and the remote theater viewer. Operations center 240 facilitates the business transactions, but does not control or enter into these transactions. Once the business agreement is defined between the content owner 220 and the retail exhibitor 230—data is entered from the content owner 220 into databases (not shown in FIG. 2) associated with operations center 240 to enable the retail exhibitor 230 to sell movies/cinema and movie-related products to the remote theater viewer.

Figure 3:
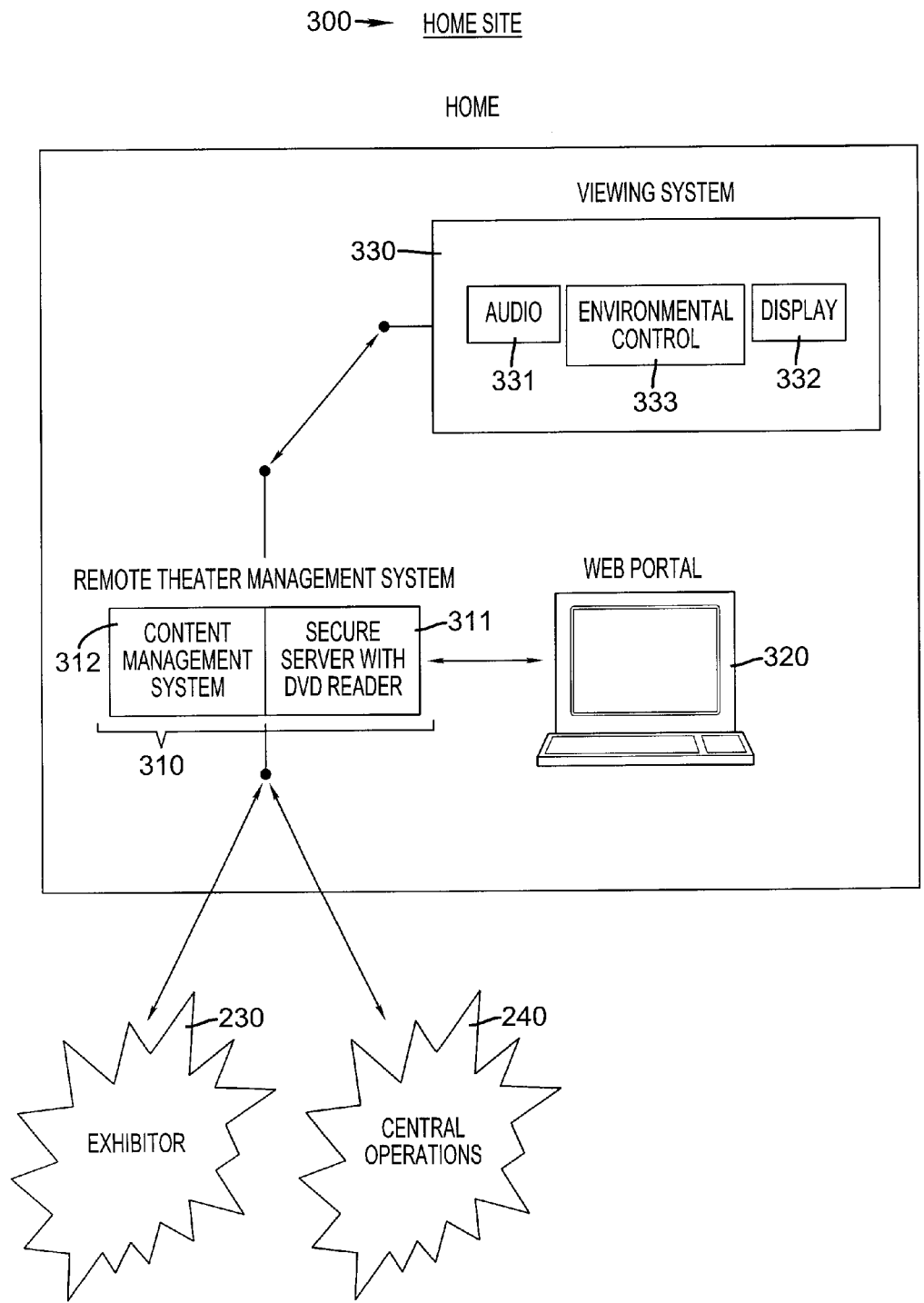
FIG. 3 illustrates an exemplary remote theater system according to the present invention.

FIG. 3 illustrates an exemplary remote theater system 300 that may be used in a home environment. Remote theater system 300 includes a remote theater management system 310 with a secure content server 311 for playback of the movie under strict digital rights management and a content management system 312, a web portal 320, (e.g., a control console, a monitor, a handheld device with Internet access), for ordering movie packages, associated movie paraphernalia, and concessions, and a viewing system 330 including means for secure presentation of the motion picture show audio 331, display 332 and environmental control 333. The remote theater system 300 includes a means for ordering, receiving content and content decryption keys through network connections to the retail exhibitor 230 and the central operations center 240.

Figure 4:
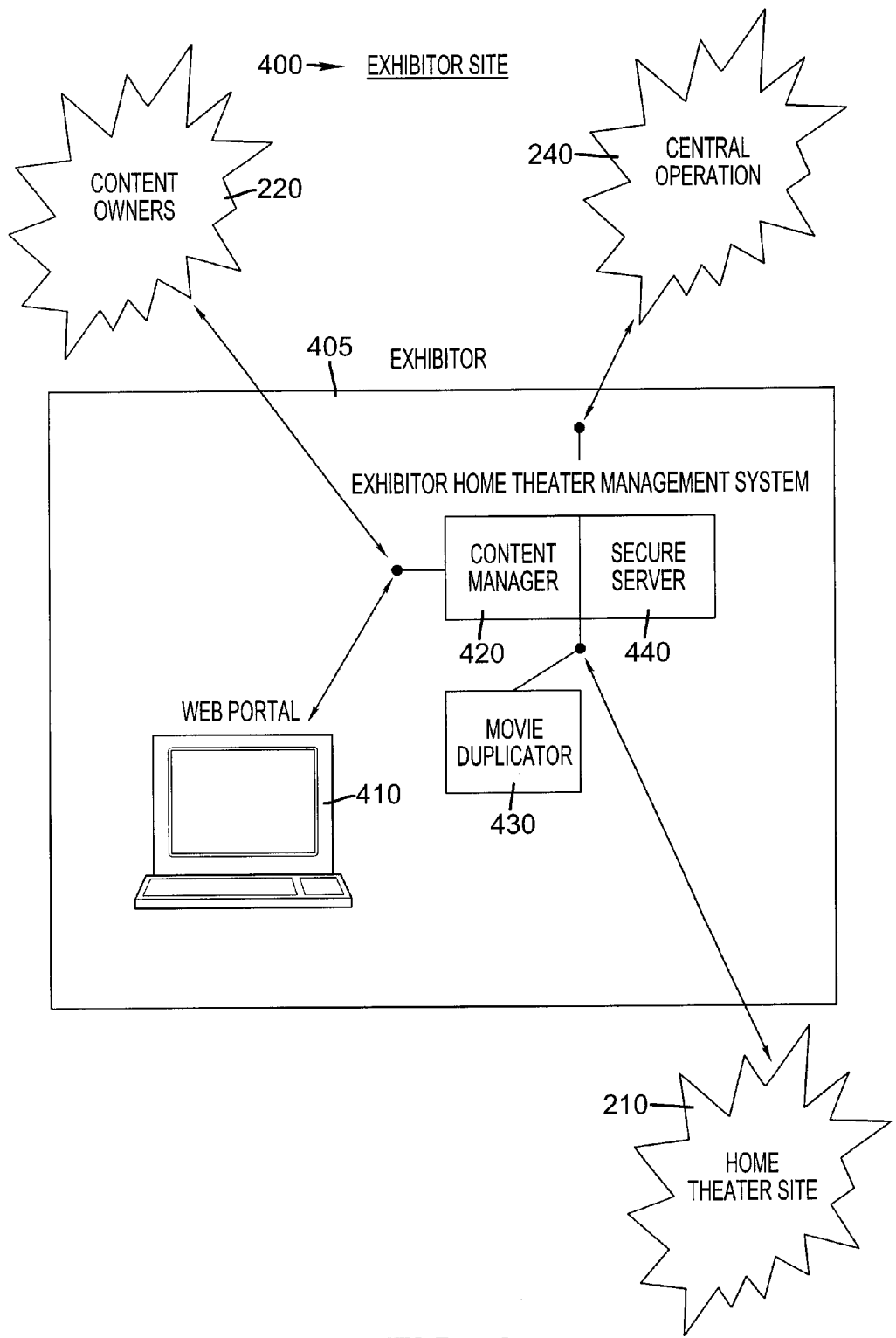
FIG. 4 illustrates the retail exhibitor's site according to the present invention.

FIG. 4 illustrates the retail exhibitor's site 400 with a focus on the day and date home theater system 405. This includes a web portal 410 and content management system 420 for defining movie packages for distribution (a package containing all or some of a movie, trailers, ads, special alternative content), a secure server 440 for receiving secure distribution of the digital movie from the content owner 220, a movie duplicator 430 for replicating the movie in advance of subsequent physical delivery to the remote theater 210, and a connection to the operations center 240 for back office support, customer relations management, and digital rights management associated with the remote theater content. Each retail exhibitor site can be thought of as a "hub" for a local area network connecting an array of "spokes" with each spoke representing a screen for showing of the digital motion picture. The cinema/movie screens can be both within the retail theater complex, under contractual arrangements between a studio and exhibitor; or at local area remote theaters, under contractual arrangements associated with "day and date" remote theater exhibition.

Figure 5:
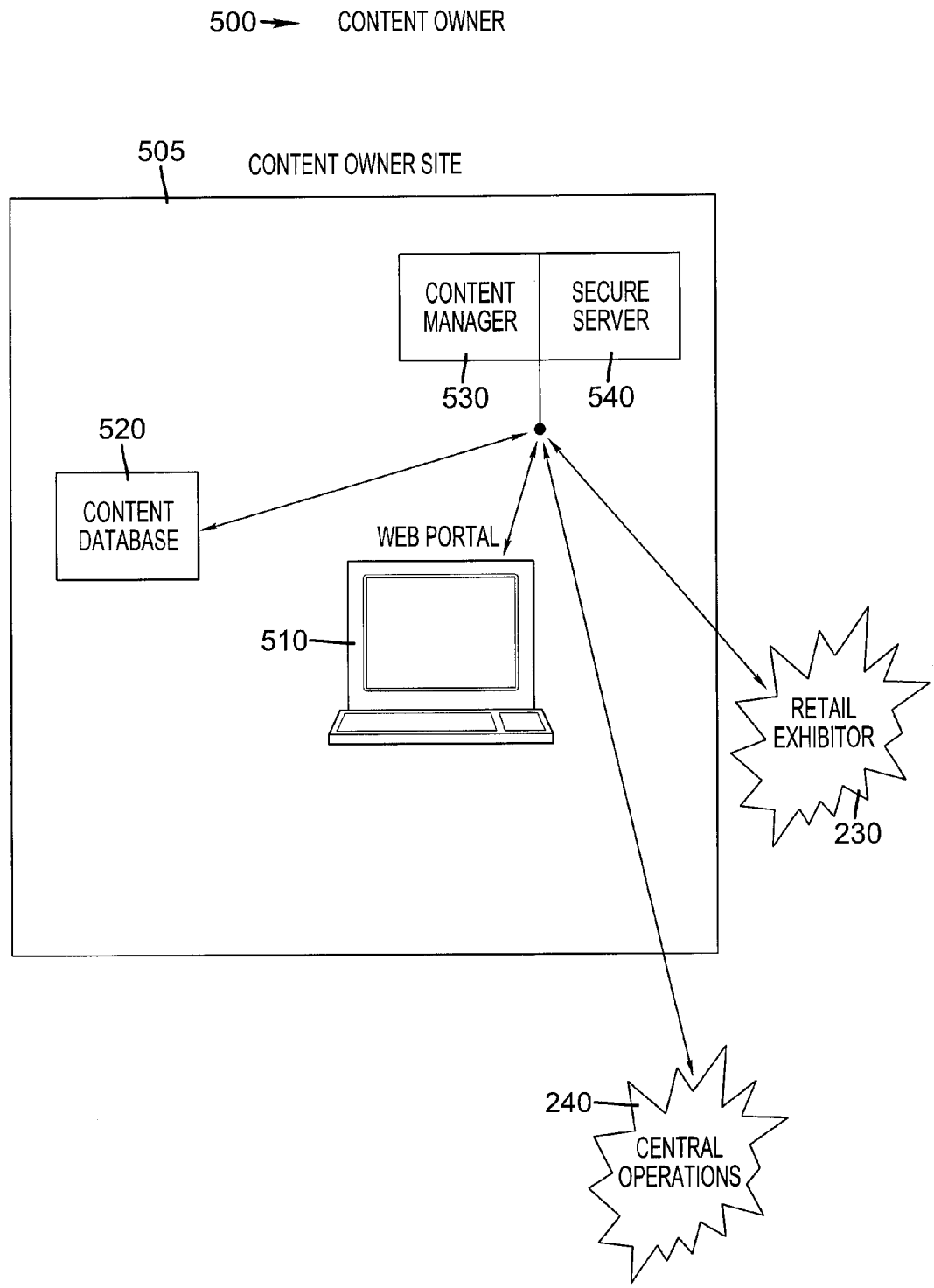
FIG. 5 illustrates an exemplary content owner's system according to the present invention.

FIG. 5 illustrates an exemplary content owner's system 500 at content owner site 505, including web portal 510 for access via the operations center 240 enabling monitoring of the transactions between the retail exhibitor 230 and the remote theater 210 that are associated with the content owner's content. In practice there will be multiple content owners, each with a view to the transactions associated with their respective content. A content database 520 is shown for storage of audio/visual entertainment content. Content manager 530 manages the storing and upgrading of the content in cooperation with a secure manager server 540.

Figure 6:
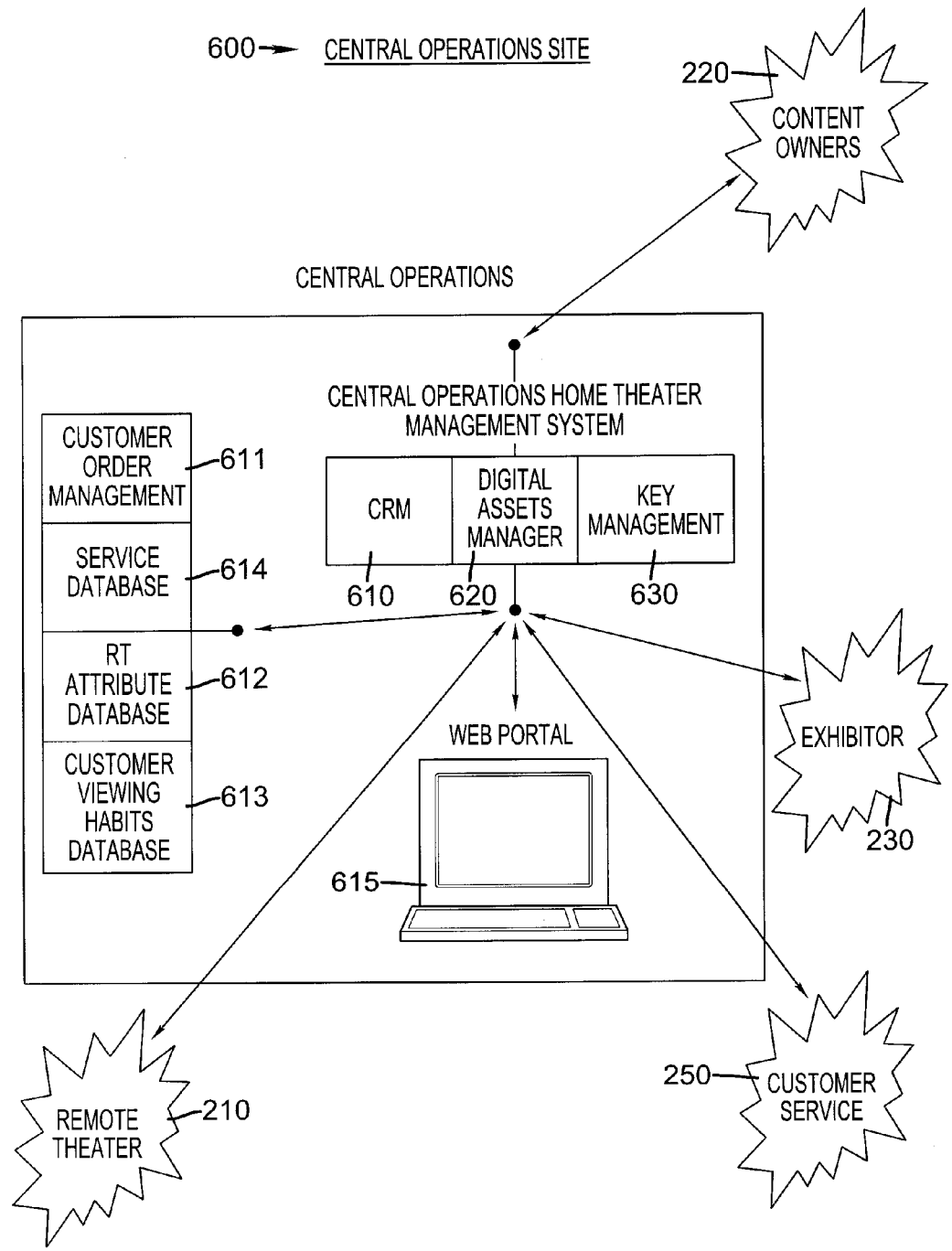
FIG. 6 illustrates major elements of the Operations Center according to the present invention.

FIG. 6 illustrates major elements of the Operations Center 600. Operations Center 600 is a large database providing Customer Relationship Management (CRM) 610, Digital Assets Management 620, and Key Management 630. Additional customized databases within the Operations Center 600 include customer order management 611, home theater attribute management 612, customer viewing habits database 613, and a service database 614. The Operations Center 600 is connected to the remote theater 210, the content owner 220, the equipment service provider 250 and the exhibitor 230. Operations Center 600 provides aggregating of customer data, secure server certificates, and acts as a security manager providing digital assets management and key generation and delivery. The Operations Center 600 also provides back-office billing, and portals for the transactions of the studio, exhibitor and home theater owner via web portal 615. The Operations Center 600 is the "hub" of a wide area network connecting the "spokes", with each spoke representing a theater complex.

The following descriptions define the operation of one manifestation of the day and date home theater invention. The major steps include—Exhibitor System and Services Sales, Installation and Calibration of Home Theater Management System, Exhibitor Contracts for Content, Exhibitor Preparation of Movie Packages, Consumer Order Placement, Content Delivery, and Content Management.

Major steps in this process include:

Installation of a secure server in the home theater owner's sites

Figure 7:
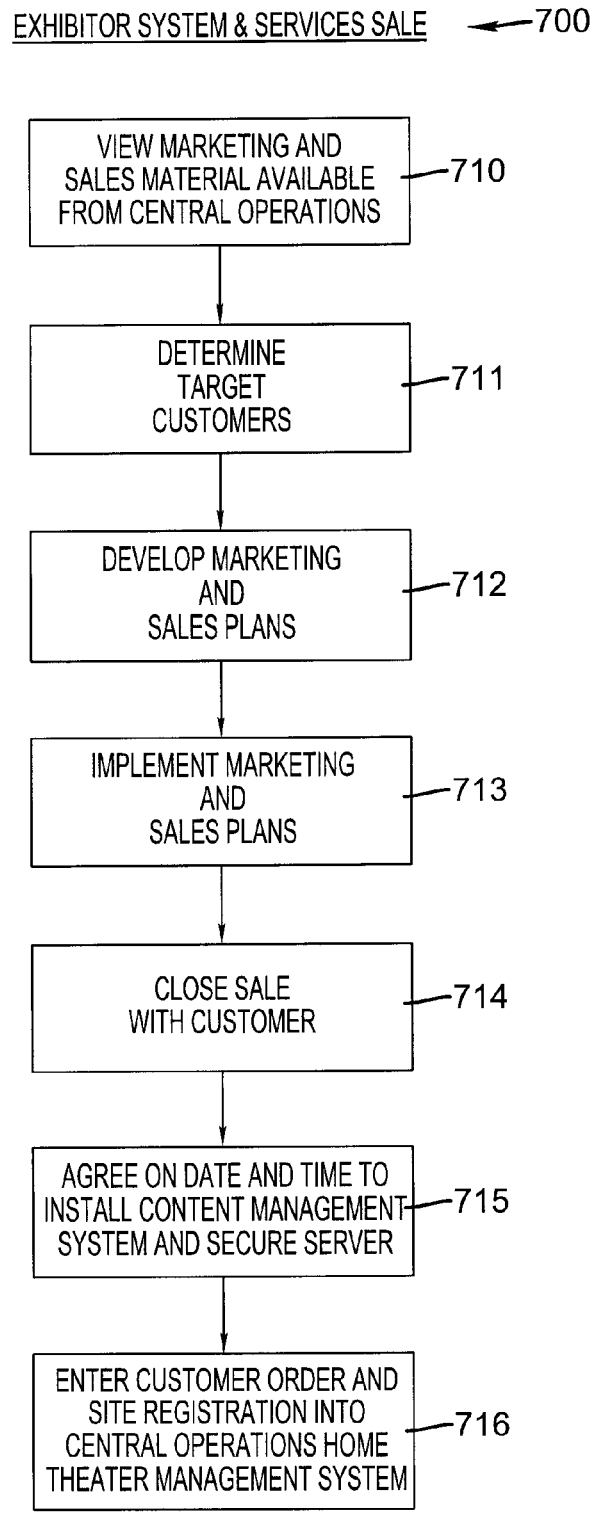
FIG. 7 illustrates an exemplary method for the retail exhibitor's System, Services, and Sales procedure according to the present invention.

Installation of a content management and replication system in the exhibitor's site Selection of Day and Date release movies by the home theater owner Order management, movie replication and delivery to the home theater owner by the local Exhibitor that is managing the account Playback and billing FIG. 7 illustrates an exemplary method for the retail exhibitor's System, Services, and Sales procedure 700. The method includes the steps of: Viewing marketing and sales material available from Operations Center 710, Determining target customers 711, Developing marketing and sales plans 712, Implementing marketing and sales plans 713, Closing a sale with customer 714, Agreeing on a date and time to install content management system and secure server 715, Entering customer order and site registration into Operations Center's Home Theater Management System 716.

The exhibitor has secure access to the operations center via a web portal. The equipment and services providers have placed marketing and sales material onto the databases in the operations center. The exhibitor makes use of the data available to them for determining target customers, development of marketing plans and back office management of the sales transactions including entering of customer information, site registration, and payment information. In one example embodiment, the exhibitor may be a franchisee of the equipment and service provider with the operations center being provided by the franchiser and used to manage the sales operations for the franchisee.

Figure 8:
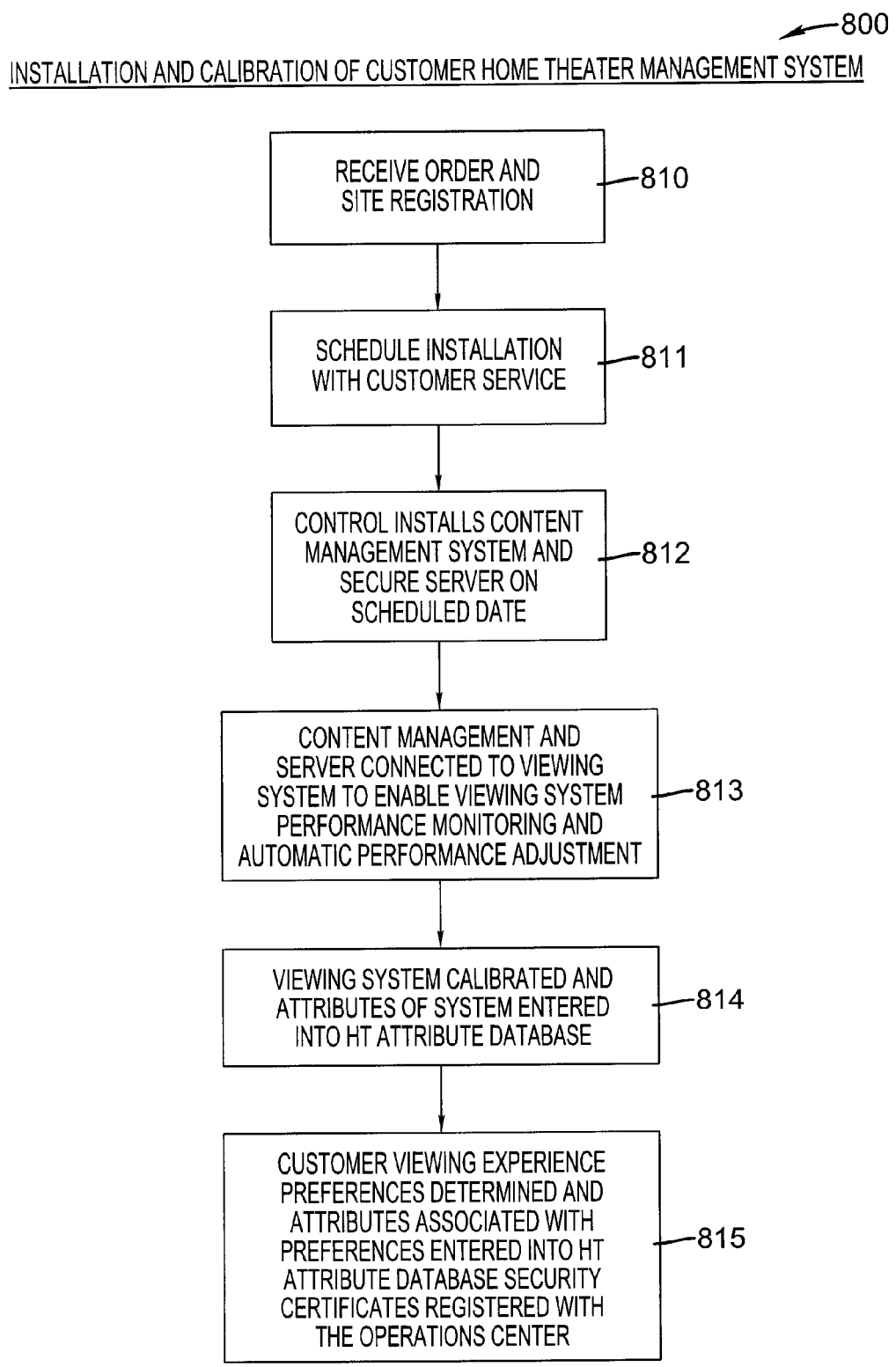
FIG. 8 illustrates a method for managing the installation and calibration of a Remote Theater (RT) owner's system according to the present invention.

FIG. 8 illustrates a method 800 for managing the installation and calibration of a Remote Theater (RT) owner's system. The method 800 includes the steps of: Receiving order and site registration 810, Scheduling installation with Customer Service 811, Controlling installation of content management system and secure server on scheduled date 812, Connecting Content management and server to viewing system to enable viewing system performance monitoring and automatic performance adjustment 813, Viewing system calibrated and attributes of system entered into RT attribute database 814, Customer viewing experience preferences determined and attributes associated with preferences entered into RT attribute database and Security Certificates registered with the operations center 815.

In one exemplary embodiment, the installation services have received an order through the central operations center for installation of the day and date home theater system. On a mutually agreed upon date the content management system, secure server and home theater system are installed at the home. The viewing system is calibrated, with all significant attributes of the system logged into the home theater attribute database at the operations center. Significant attributes could include, projector type, resolution, audio system type, number of sound channels—e.g. stereo or surround sound, and any special requirements such as hearing impaired systems. In addition any specific customer viewing preferences are determined and entered into the database in order to be able to provide the best service to the customer. Once installed and calibrated the" day and date" home theater system is registered, and the certificates to enable secure playback of content are sent to the central operations center.

An Alternate Description of the Sales and Installation Service is as Follows:

"Day and Date" (D&D) Home Theater Equipment Sales and Installation (in the present invention, the retail exhibitor takes the sales lead whereas—all competing follow on movie markets exclude the retail exhibitor from further business relationships with customers purchasing movies or movie-related product after the initial release of "day and date" movie/cinema)

The retail exhibitor takes the sales lead for their respective local area—from developing the customer relationship to closing of the sale—a KEY Advantage of the present invention.

D&D RT Provider provides marketing and sales support (facilitates the invention)

D&D RT Provider provides Remote Theater installation services—managing the installation and calibration of specialized secure playback systems D&D RT Service monitors system use, performance, and provides on-line service via the operations center connectivity to the retail theaters and remote theaters, such as home theaters, bar/pub theaters, and church theaters.

Figure 9:
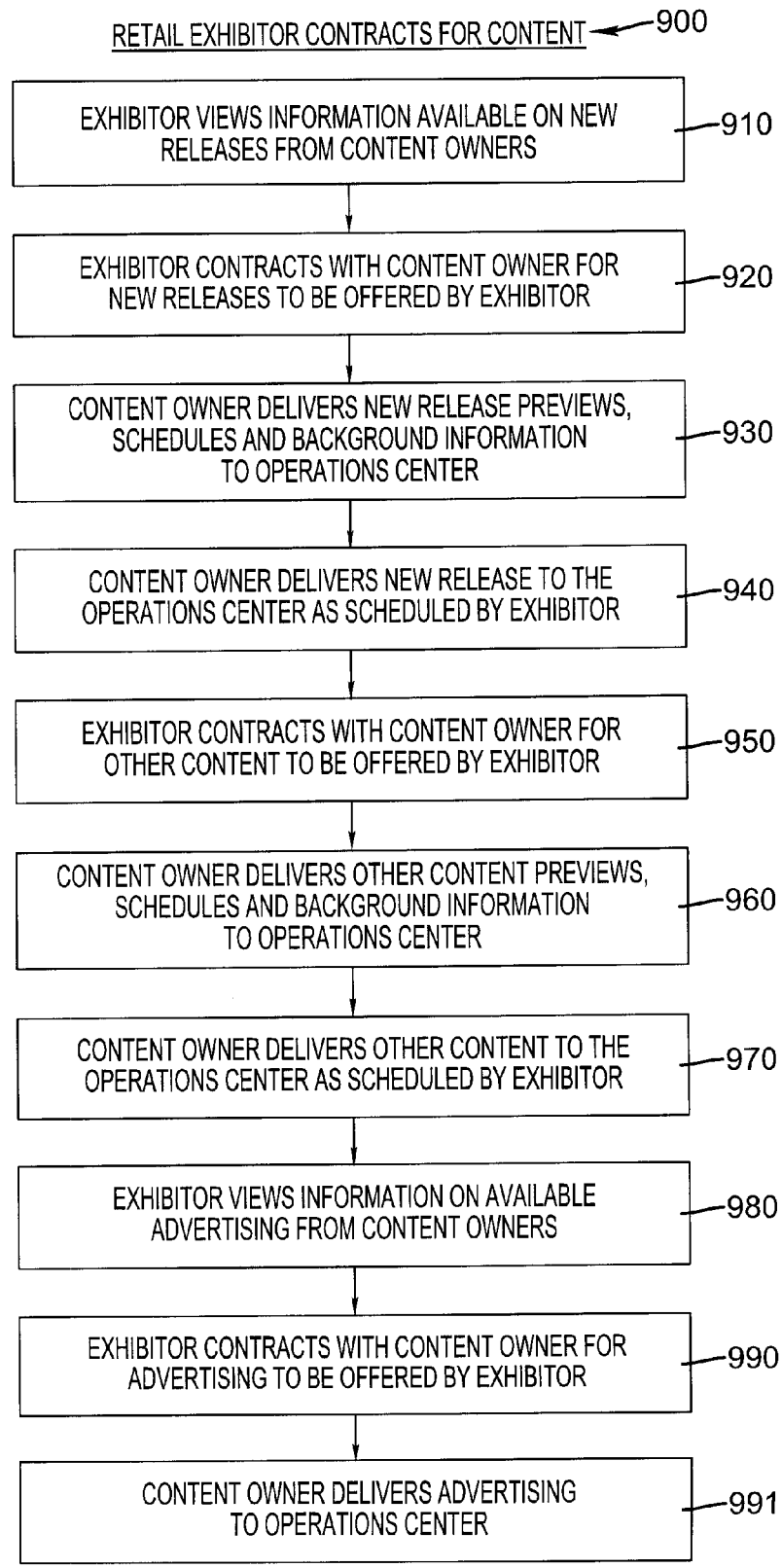
FIG. 9 illustrates a retail exhibitor's workflow according to the present invention.
Figure 10A:
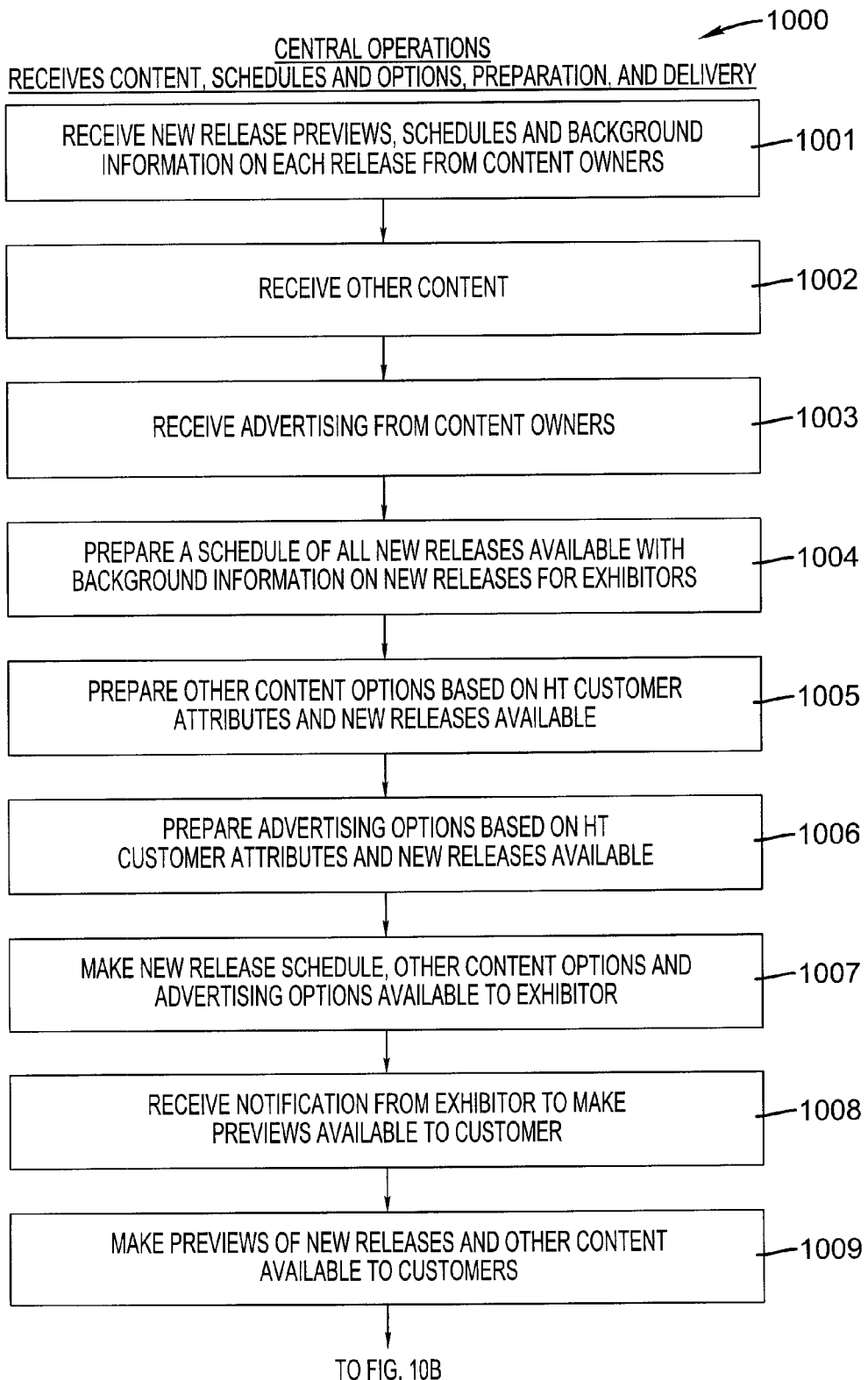
FIG. 10 illustrates a content owner's workflow according to the present invention.
Figure 10B:
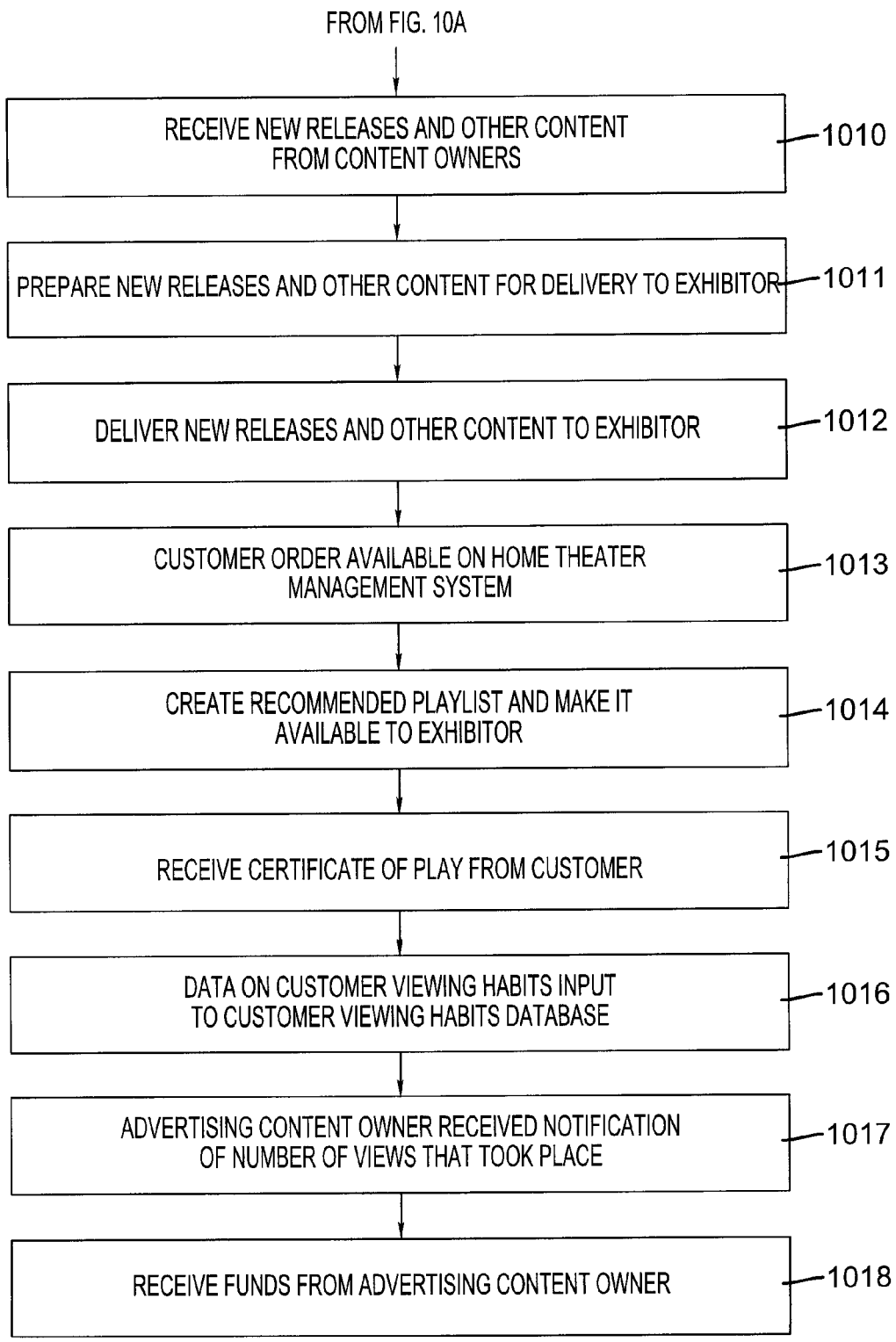
Figure 11:
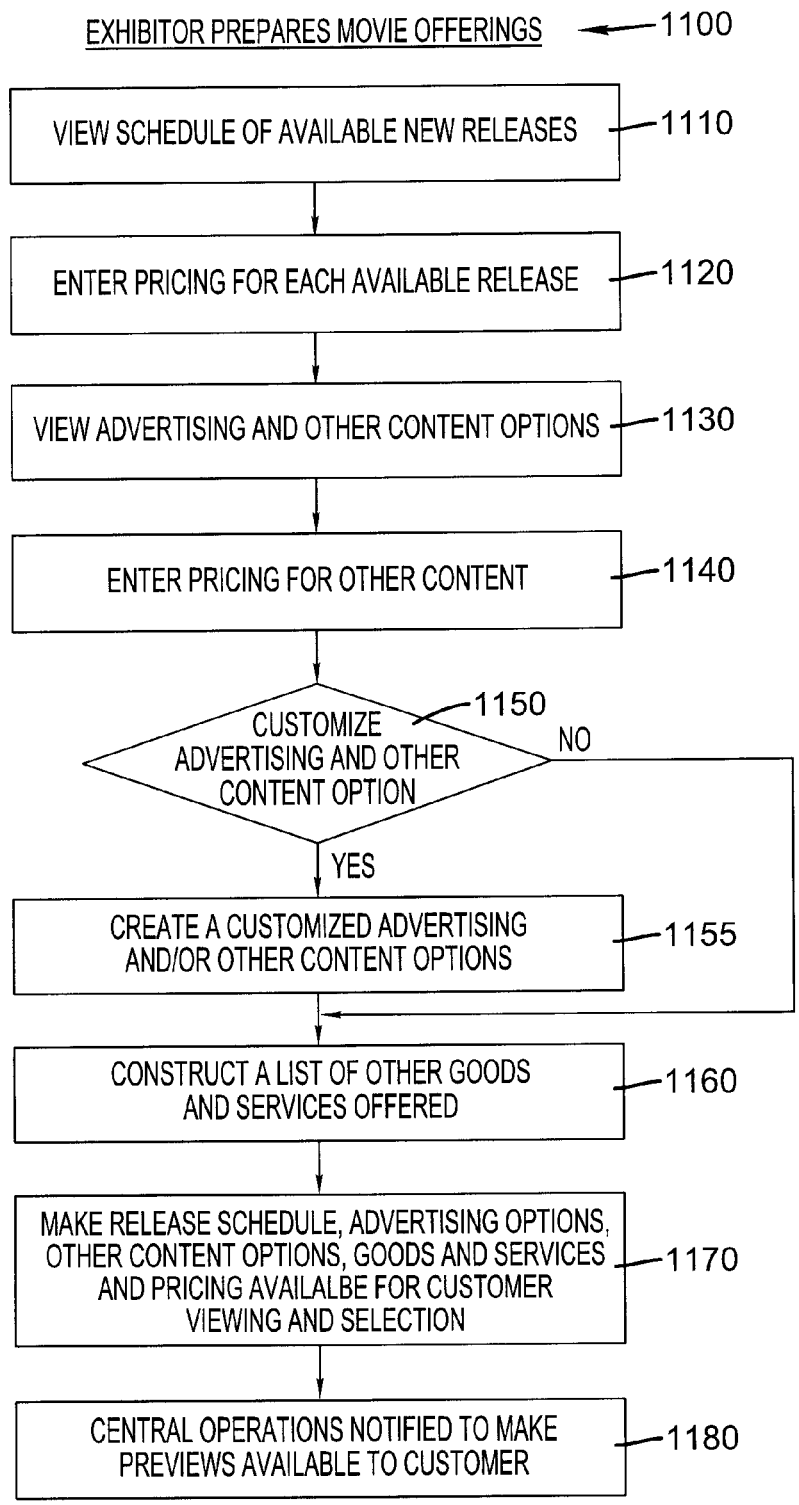
FIG. 11 illustrates a retail exhibitor's interaction with the operations center workflow according to the present invention.

During Installation the retail exhibitor registers the customer, name, billing info, location using the web portal access to the operations center third party manufacturers a secure RT server, and installs a private key to be used for Key Delivery Message decryption third party HT services installs the day and date Home Cineserver system, and associated equipment as needed third party registers the server with the operations center, the database now containing, name address, billing information, any specific watermarking information and the certificate for the server third party enables secure access to the Day and Date Movie ordering portal for the home theater owner FIGS. 9, 10 and 11 show example work flows for the retail exhibitor 900, content owners 1000, and interaction with the Operations Center 1100.

Regarding FIG. 9, Retail Exhibitor workflow 900 for contracting the dissemination of cinema and cinema-related content, includes the following steps:

910 Exhibitor views information available on new releases from content owners

920 Exhibitor contracts with content owner for new releases to be offered by Exhibitor 930 Content owner delivers new release previews, schedules and background information to Operations Center 940 Content owner delivers new release to the Operations Center as scheduled by Exhibitor 950 Exhibitor contracts with content owner for other content to be offered by Exhibitor 960 Content owner delivers other content previews, schedules and background information to Operations Center 970 Content owner delivers other content to the Operations Center as scheduled by Exhibitor 980 Exhibitor views information on available advertising from content owners 990 Exhibitor contracts with content owner for advertising to be offered by Exhibitor 991 Content owner delivers advertising to Operations Center Regarding FIG. 10, Content owner workflow (1000) includes the following steps:

1001 Receive new release previews, schedules and background information on each release from content owners 1002 Receive other content 1003 Receive advertising from content owners 1004 Prepare a schedule of all new releases available with background information on new releases for Exhibitors 1005 Prepare other content options based on HT customer attributes and new releases available 1006 Prepare advertising options based on HT customer attributes and new releases available 1007 Make new release schedule, other content options and advertising options available to Exhibitor 1008 Receive notification from Exhibitor to make previews available to customer 1009 Make previews of new releases and other content available to customers 1010 Receive new releases and other content from content owners 1011 Prepare new releases and other content for delivery to Exhibitor 1012 Deliver new releases and other content to Exhibitor 1013 Customer order available on Home Theater Management System 1014 Create recommended play list and make it available to Exhibitor 1015 Receive certificate of play from customer 1016 Data on customer viewing habits input to customer viewing habits database 1017 Advertising content owner received notification of number of views that took place 1018 Receive funds from advertising content owner Regarding, FIG. 11, the Retail Exhibitor Interaction with the operations center workflow 1100 includes the following steps:

1110 View schedule of available new releases

1120 Enter pricing for each available release

1130 View advertising and other content options

1140 Enter pricing for other content

1150 Optional Customize advertising and other content option

1155 Create a customized advertising and/or other content option

1160 Construct a list of other goods and services offered

1170 Make release schedule, advertising options, other content options, goods & services and pricing available for customer viewing and selection 1180 Central Operations notified to make previews available to customer The above workflow facilitates distribution deals for movies, trailers, advertisements, and other auxiliary content such as special shorts, cartoons etc. Multiple content owners can be selected via the portal to the operations center, content selected. The content owners will form distribution agreements with the exhibitor with the relevant terms and conditions defining the rules of engagement for the exhibitor defined at the operations center. Content owners can stage the associated content at the Operations Center, and enable the exhibitor to package the various pieces of content into a show package for distribution to the remote theater owner. The Operations Center manages the transactions between the retail exhibitor and the content owner, enables building of show packages, scheduling of show packages, and back office functionality managing the associated sales and payment transactions.

Example optional packages are as follows:

Retail Exhibitor Movie Package Creation—(Retail Exhibitor transactions utilize the same relationships established for retail theatrical distribution; whereas all competing follow on movie markets exclude the retail exhibitor from the business):

Retail exhibitor contracts with content owners for advertisements, movie shorts, trailers, the new release digital features, alternative content, "specials" e.g. behind the scenes, out takes etc. The content owner may also contract for distribution of movie paraphernalia—e.g. toys, t-shirts, associated with the movie.

Retail exhibitor fills out the pricing table and schedule of availability and enters into the operations center database via the exhibitor web portal. Additional information may include genre, ratings etc. Movie package may include specials for the D&D release such as movie paraphernalia. The operations center retains the posted information—and exposes this information to the subscribing remote theater owners within the retail exhibitor's local network. Unencrypted trailers are automatically downloaded to the remote theater owner's playback equipment for review within the remote theater, such as homes, bars/pubs, or mega-churches. Alternately these could be delivered as an accompaniment to a prior movie rental, or via DVD mail distribution from the retail exhibitor.

Figure 12A:
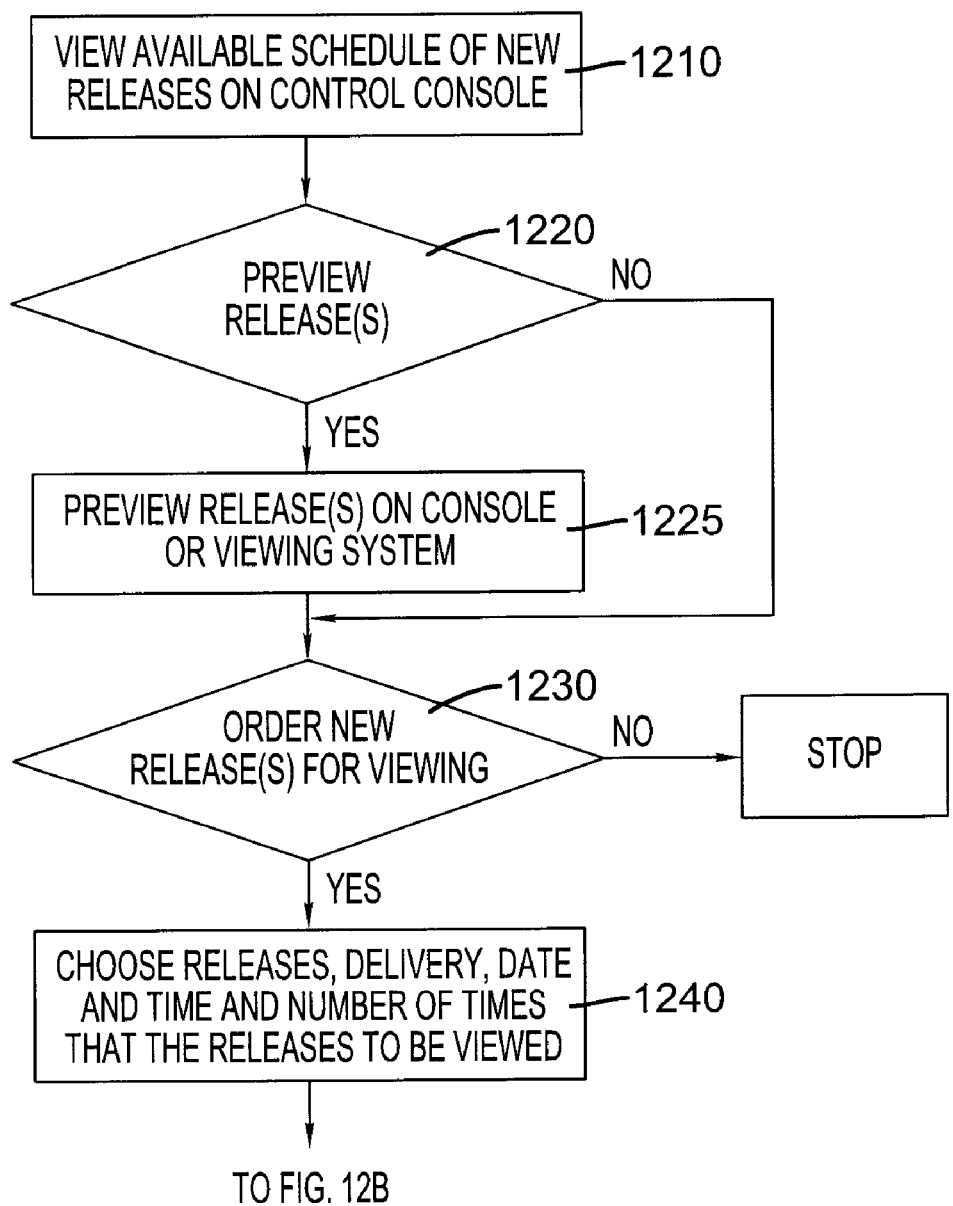
FIG. 12 illustrates an exemplary workflow 1200 for ordering movies by a home theater owner according to the present invention.
Figure 12B:
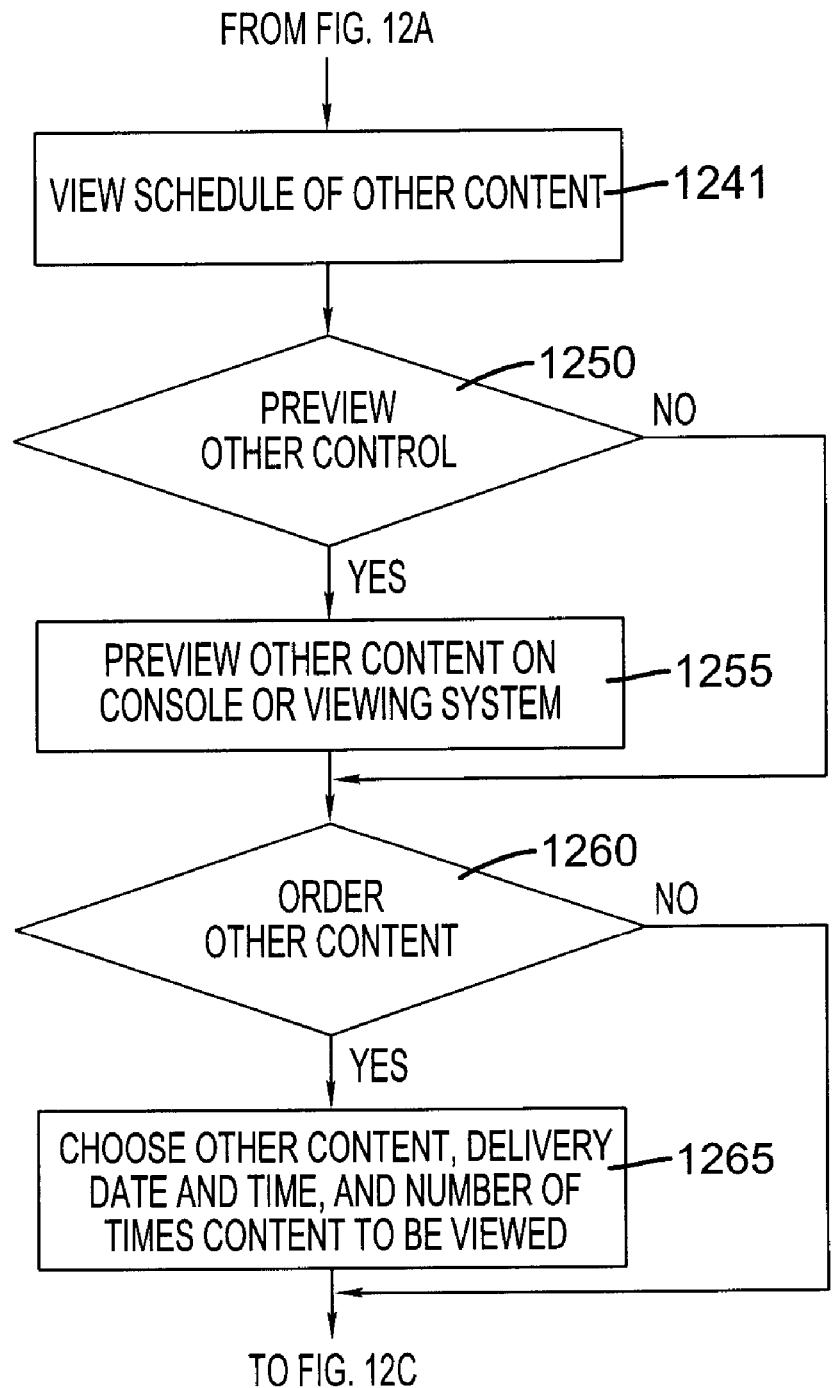
Figure 12C:
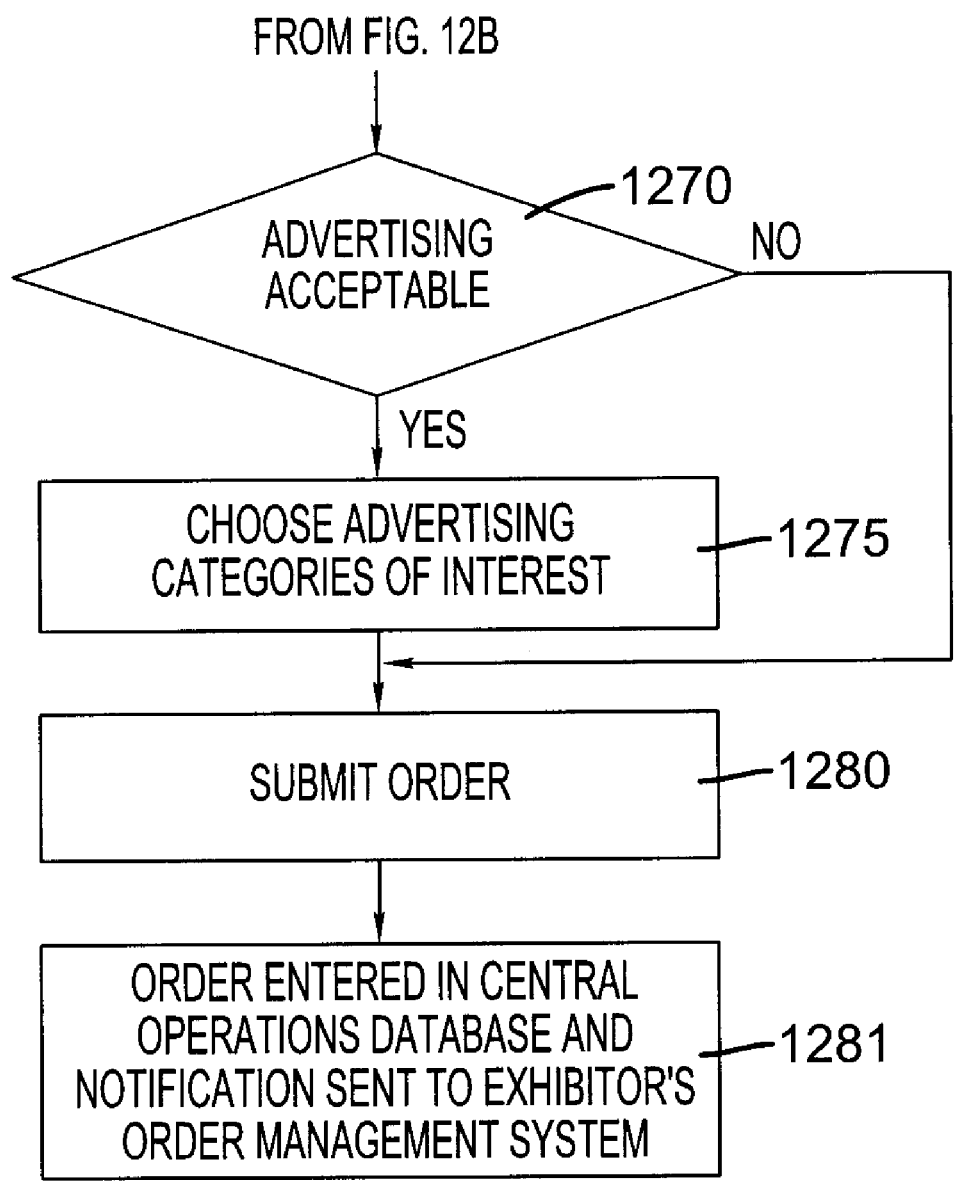

FIG. 12 illustrates an exemplary workflow 1200 for ordering of movies by a home theater owner, including the steps of:

1210 View available schedule of new releases on control console

1220 Optional preview of the new releases

1225 Preview new releases on a console or other viewing system

1230 Optional ordering of a new release

1240 Choose releases, delivery, date and time and number of times that the releases to be viewed 1241 View schedule of other content 1250 Optional preview of additional content 1255 Preview additional content on a console or other viewing system 1260 Optional ordering of additional content 1265 Choose additional content, delivery schedule, and number of times for viewing 1270 Option to accept advertising content 1275 Choose advertising categories of interest 1280 Submit order 1281 Order entered in central operations database and notification sent to Exhibitor's order management system The customer is enabled to log into his secure "Day and Date" rental account (managed by the Operations Center). The customer can review the available show schedules, review trailers, and select the show, concessions, special movie memorabilia that they wish to view.

Figure 13A:
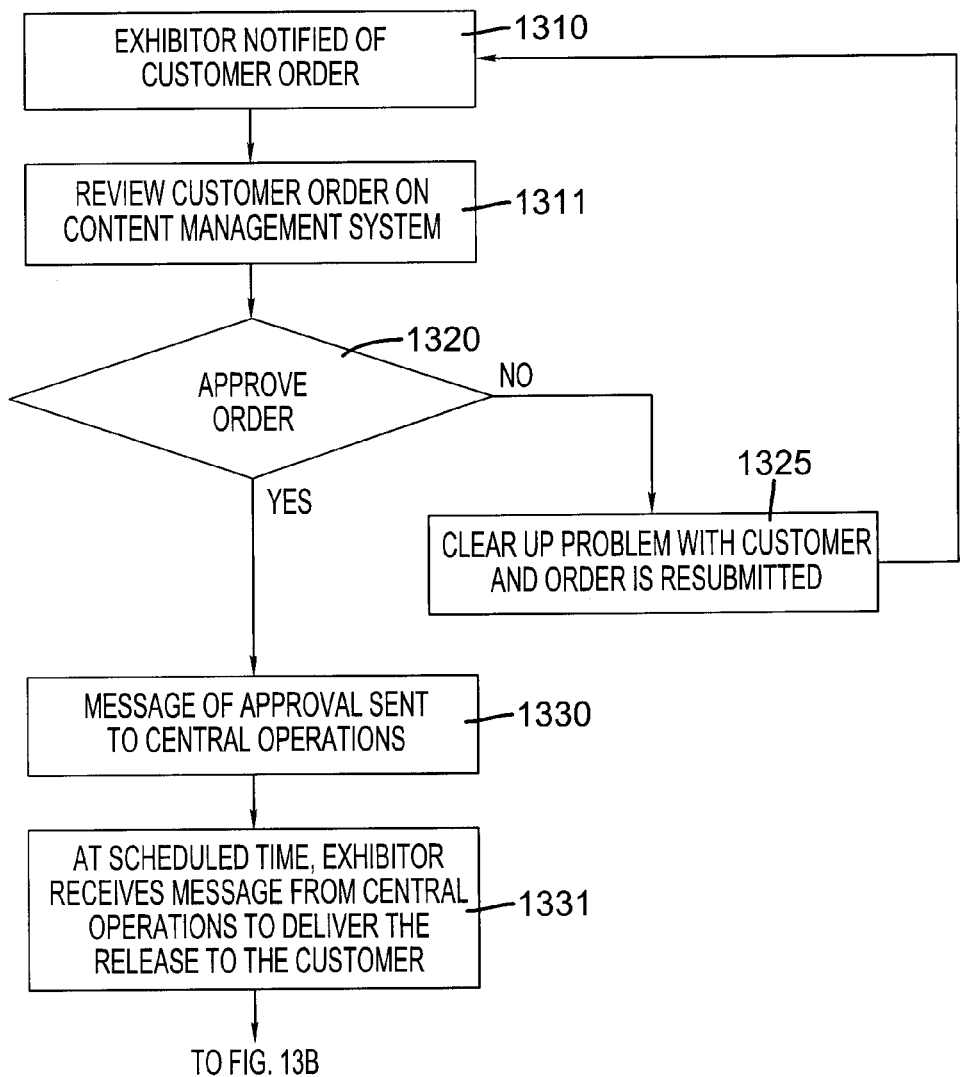
FIG. 13 illustrates an exemplary retail exhibitor workflow 1300 for processing the order by the home theater owner according to the present invention.
Figure 13B:
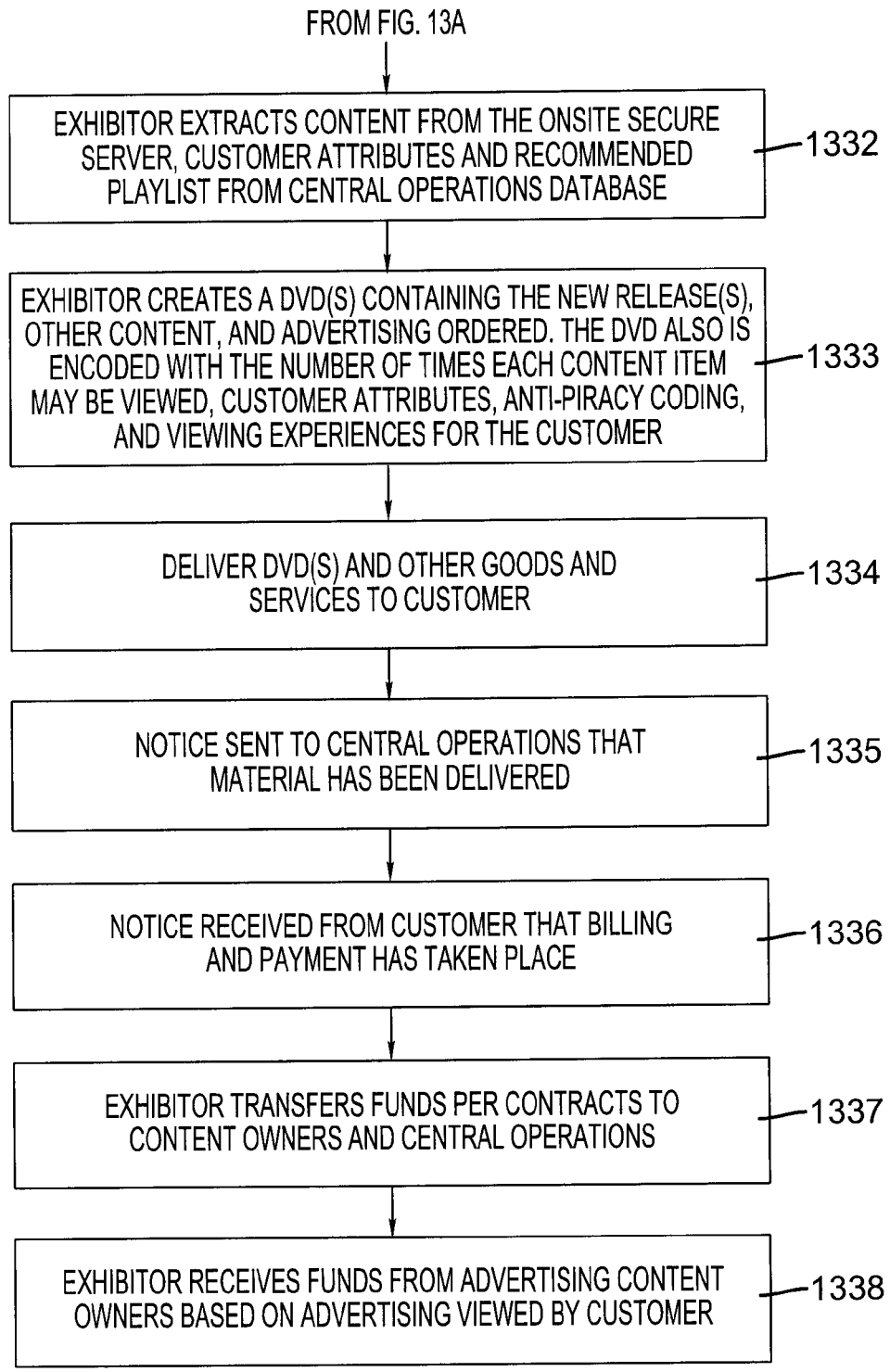
Figure 14A:
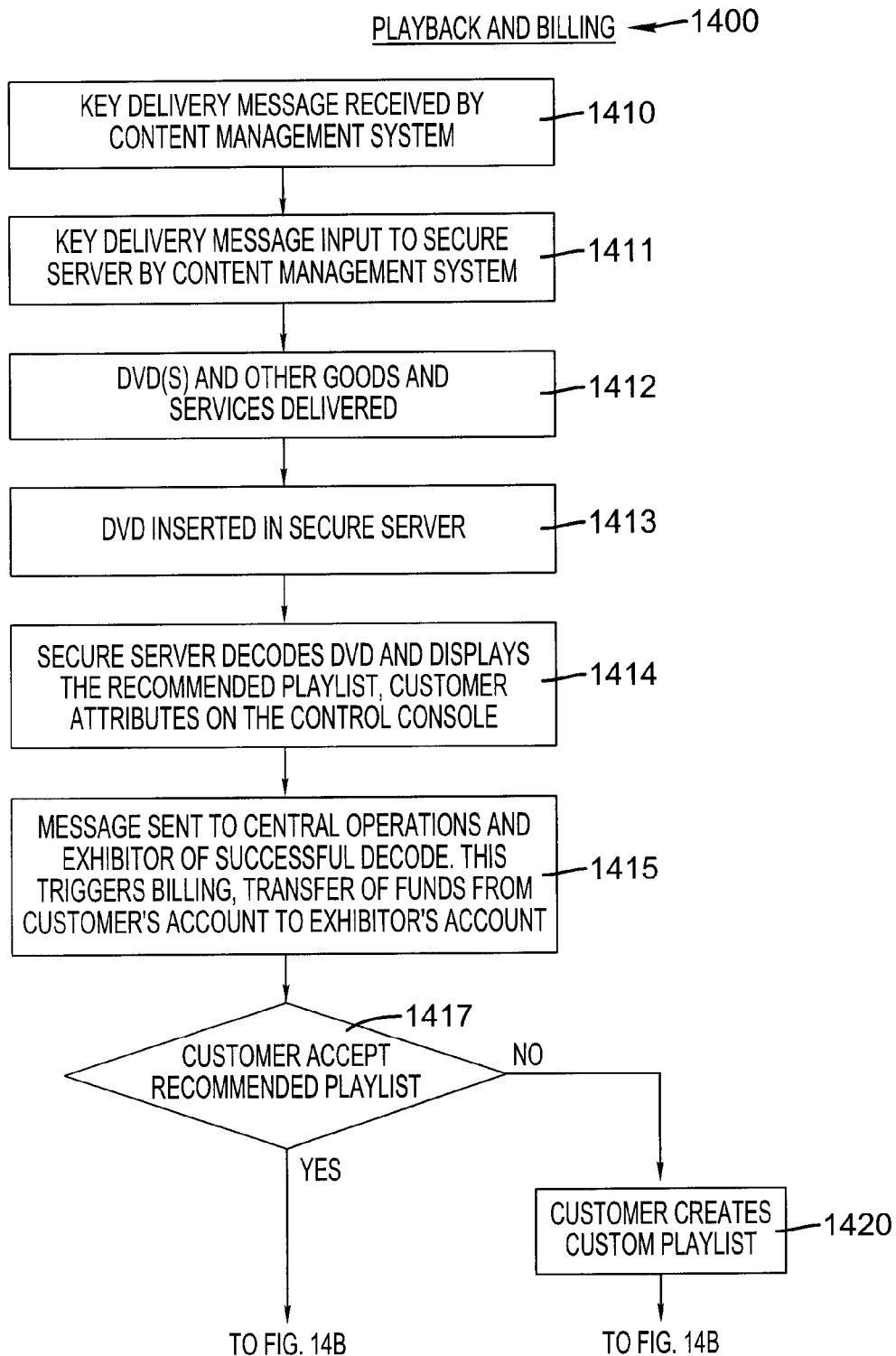
FIG. 14 illustrates an exemplary playback and billing method according to the present invention.
Figure 14B:
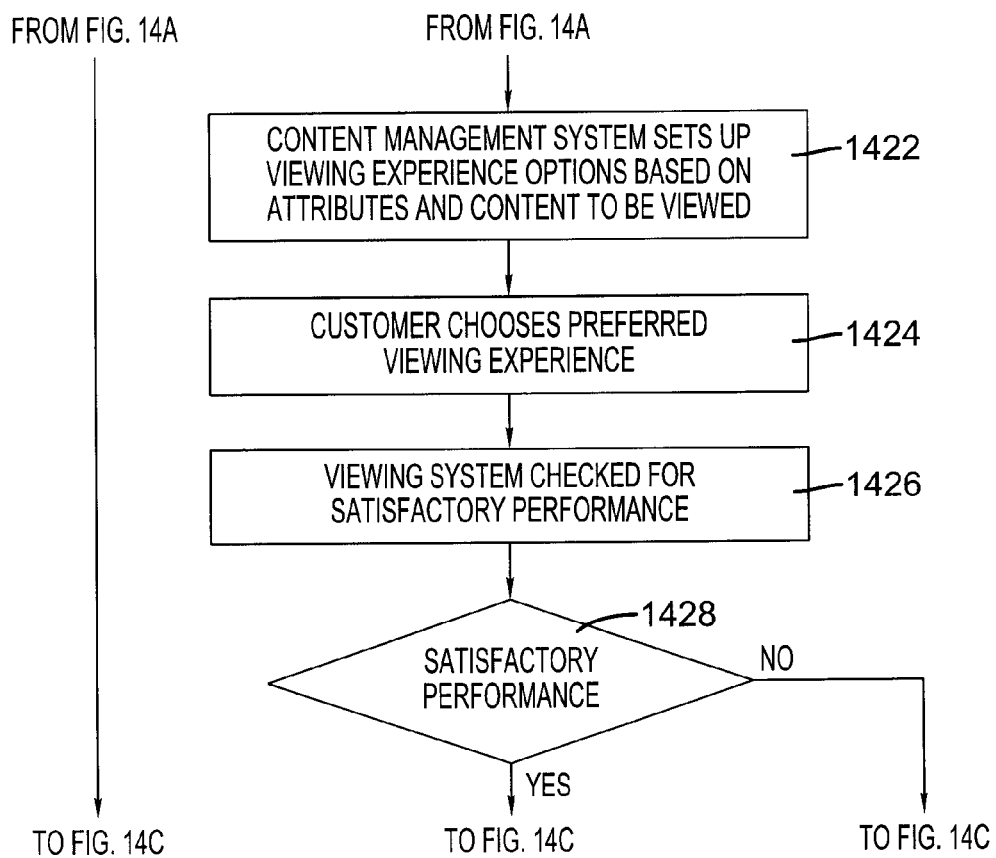
Figure 14C:
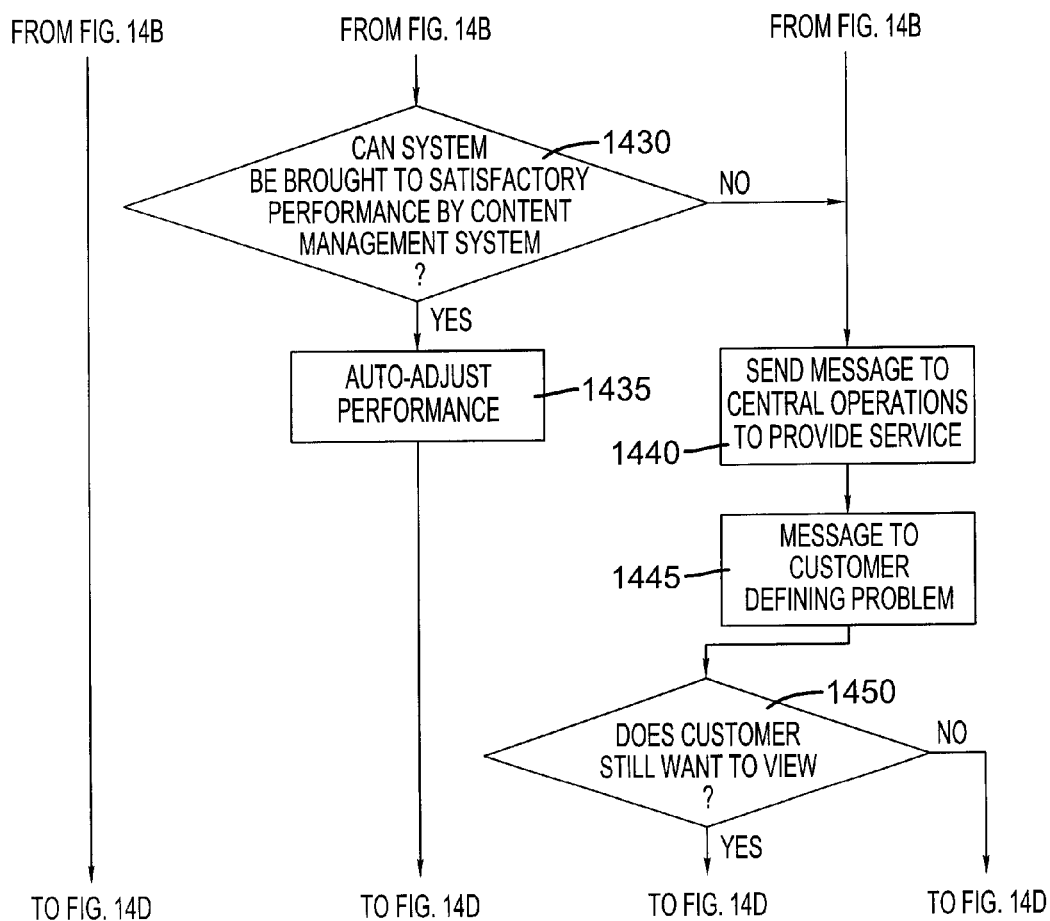
Figure 14D:
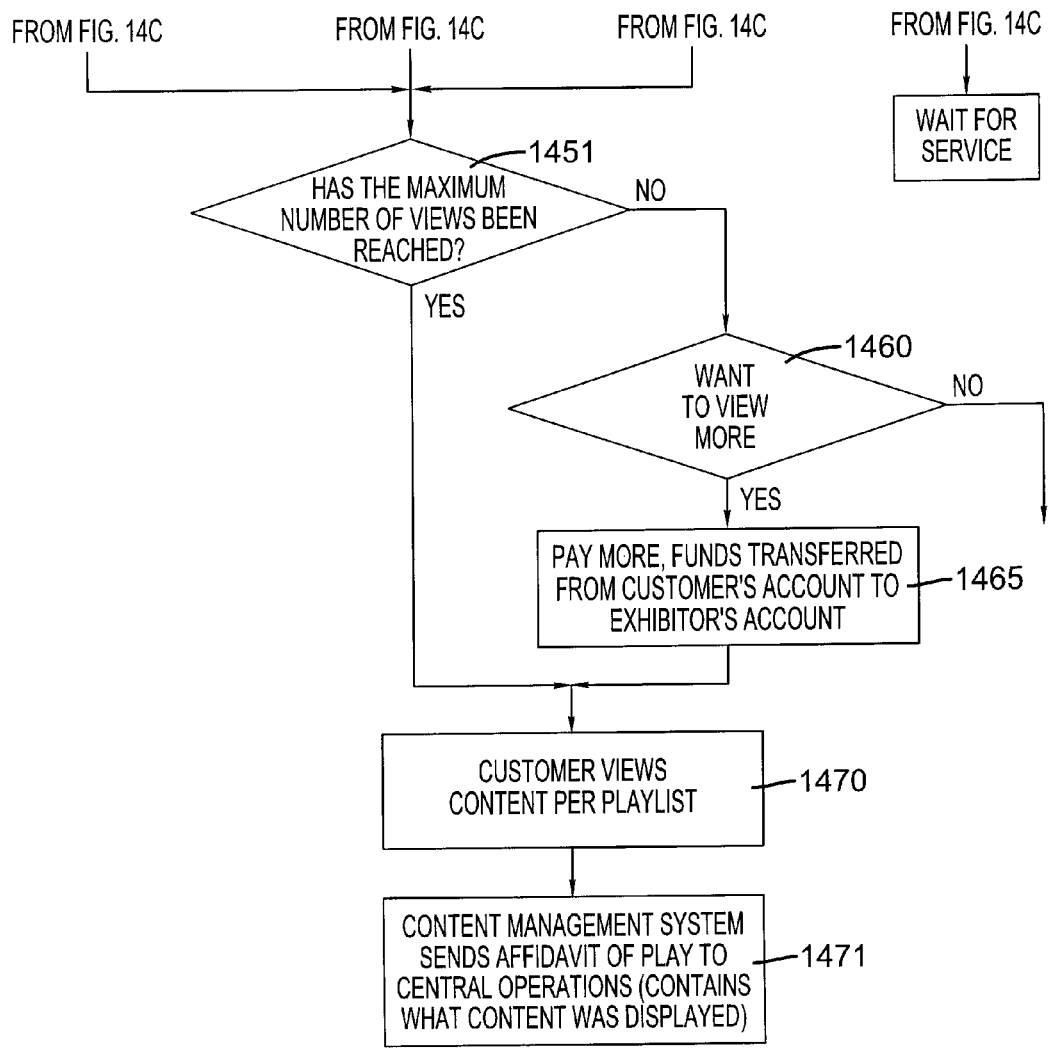

FIG. 13 illustrates an exemplary retail exhibitor workflow 1300 for processing the order by the home theater owner, from receipt of order through to billing and payment and includes the steps of:

1310 Exhibitor notified of customer order

1311 Review customer order on content management system

1320 Optional order approval

1330 Message of approval sent to Central Operations

1331 At scheduled time, Exhibitor receives message from Central Operations to deliver the release to the customer 1332 Exhibitor extracts content from the onsite secure server, customer attributes and recommended play list from Central Operations database 1333 Exhibitor creates a DVD(s) containing the new releases(s), other content, and advertising ordered. The DVD also is encoded with the number of times each content item may be viewed, customer attributes, anti-piracy coding, and viewing experiences for the customer. The DVD may be a Blu-Ray™, HD-DVD™, or an alternative digital video media that either combines the above technologies or provides its own distinct technology.

1334 Deliver DVD(s) and other goods & services to customer

1335 Notice sent to Central Operations that material has been delivered

1336 Notice received from customer that billing and payment has taken place

1337 Exhibitor transfers funds per contracts to content owners and Central Operations 1338 Exhibitor receives funds from advertising content owners based on advertising viewed by customer; including downloading of the content and packaging the content for delivery. Delivery means could be via a broadband network of via physical media such as high capacity DVD.

A further description of the Remote Theater Owner—Movie Preview and Order Placement process is as follows:

Customer logs into his secure D&D rental account. Access to this web page could be via the retail exhibitor's home page to enhance the customer-vendor relationship. Customer reviews the schedule of upcoming releases including title, abstract, extras with the package, and pricing. Extras may include a special live feed interview from the director for D&D HT subscribers.

Customer selects a title to preview. The system launches the trailer on the PC browser, and optionally launches the previously downloaded trailer on the home theater system.

Customer orders the selected movie package via the web portal—this is logged to the operations center's database and reflected in the retail exhibitor's web portal as well. Optional Concession orders can be placed as well, including potential access to local catering services. Order is acknowledged and the Movie and Key Distribution process initialized.

FIG. 14 illustrates an exemplary playback and billing method 1400, which includes the steps of:

1410 Key delivery message received by content management system

1411 Key delivery message input to secure server by content management system

1412 DVD(s) other goods & services delivered (DVD includes Blu-Ray™, HD-DVD™, or other high-definition digital video media)

1413 DVD inserted in secure server

1414 Secure server decodes DVD and displays the recommended play list, customer attributes on the control console 1415 Message sent to Central Operations and Exhibitor of successful decode. This triggers billing, transfer of funds from customer's account to Exhibitor's account 1417 Optional Customer acceptance of recommended play list 1420 Option to create custom play list and equipment set-up 1422 Content management system sets up viewing experience options based on attributes and content to be viewed 1424 Customer chooses preferred viewing experience 1426 Viewing system checked 1428 Viewing system deemed satisfactory 1430 Option to manage system performance with content management system 1435 Performance of system auto-adjusted 1440 Option to contact equipment service to bring system performance into specifications 1445 Message sent to customer defining existing problem 1450 Option to view the show with out of specification equipment 1452 Customer waits for service 1459 Test for number of show plays under contract 1460 Option to purchase additional show plays 1465 Customer has funds transferred for additional viewing 1470 Customer views content per play list 1471 Content management system sends affidavit of play to Central Operations describing the content that was displayed From the customer perspective this process can be largely transparent, however, behind the scenes the Operations Center facilitates security, and proper playback of the show. Key Delivery Messages (KDM) are generated which carry the content decryption keys along with metadata defining the playback agreement—dates, times and number of plays that have been purchased. The KDM is delivered to the remote theater owner's equipment via an Internet connection. The entire process of movie and Key distribution along with a variety of options is described as follows:

Movie and Key Distribution

All content are delivered to Exhibition from the content owners selected distributor. These movies are packaged using a format targeting home theater use, rather than for theatrical display. Image quality is much greater than that currently available from a VHS tape or a DVD.

The exhibitor generates Show Play lists that align with the movie packages that have been offered. The Show Play lists and respective content is duplicated and stored on a portable media such as Blu-Ray™ DVD data disk, or HD-DVD™, or portable hard drives.

Once the order is approved—a Key Delivery Message is generated enabling content playback and decryption for a specific predetermined set of rights management conditions.

Conditions can include single play option between a certain date window, multiple play options between a certain date window, option a or b during the date window, followed by an OK to make an unencrypted—DVD copy after a certain date.

Key Delivery can be via the internet, an email attachment, a thumb drive or other digital media transport means. Emails and thumb drive delivery will require the customer to load the KDM into the server—whereas an internet delivery could be direct to the playback server. The system acknowledges to the customer and reports back to the operations center that all content and keys are available for the showing. Content and Keys can be hand delivered to the customer—together or on two separate trips. Delivery on the day of the showing could be combined with delivery of the movie extra's and concessions Once the logistics for day and date showing of the movie have been completed the customer is ready to enjoy the show. An example describing one possible workflow, including incorporation of an invisible watermark, auditing of playback and reporting back to the operations center of the playback event is shown below.

CINEMA Playback & Audit Report & Payment

Figure 15:
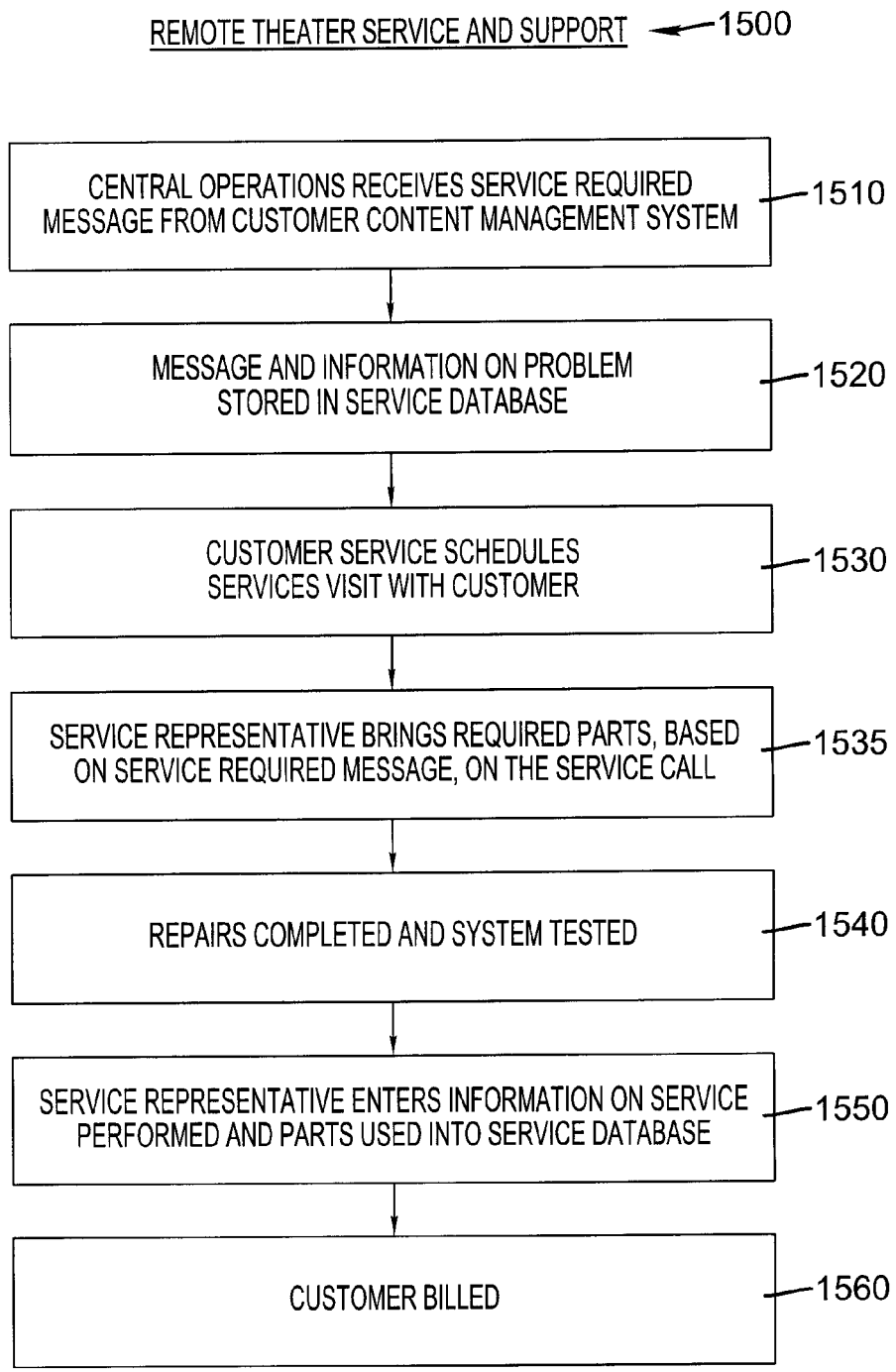
FIG. 15 illustrates an example remote theater service and support workflow according to the present invention.

Customer initiates the cinema (also referred to as movie or show) by selecting the desired show play list. The server accesses the KDM—decrypting it with the hidden private key to provide access to the keys for decrypting the content. The KDM only functions according to the predefined digital rights management rules. Optionally—the customer can pause, fast forward, rewind the show. Content is decrypted; an invisible watermark is added (including server serial number, time and date of play). Any customer preferences for audio or image settings are incorporated during live play. The system logs the use of the KDM and the playback of each composition in the play list. Depending on the show—the system may optionally disable the output of the server—and enable a live event feed until a queue is sent to restart the show play list. For example, the Cinema Play list may prompt play of a three trailers, than pause while a live event feed from the director is fed in. Once completed the system will send a queue to the server to move to the next composition in the show play list—such as to the feature film. An affidavit of play is sent to the operations center—and can be accessed through the studio or exhibitor portals. Content is removed from the system once the rights to use have expired The Operations Center 240 (as shown in FIG. 2) also serves as a service portal enabling remote servicing and maintenance of the remote theater owner's equipment. One example remote theater service and support workflow 1500 is illustrated in FIG. 15, and includes the steps of:

1510 Operations Center receives service-required message from customer content management system

1520 Message and information on problem stored in service database

1530 Customer service schedules services visit with customer

1535 Service representative brings required parts, based on service-required message, on the service call

1540 Repairs completed and system tested

1550 Service representative enters information on service performed and parts used into service database

1560 Customer billed

While one exemplary embodiment of the present invention is directed primarily to the use of a workstation at the site of the retail exhibitor and at the content owners, the actual physical location could be at the parent company of the retail exhibitor or content owners. Alternatively, the site of a third party entity may be designated to manage the business or a portion of the business of the retail exhibitor or content owner. Consequently, other physical sites could be incorporated by new communications technology or new management practices.

Enhancements to the Basic Process:

The exhibitor previews content and contracts with the content owners for movies, advertising and promotional material via the on site workstations to determine what is to be made available to the customer in the home. In addition to the standard workflow described above the exhibitor can use information, collected on the attributes the customer, including: sensory measurements and content preferences; the customers viewing system, such as system performance characteristics, physical dimensions of the room and audio characteristics of the room; the content available for viewing; and the content to be viewed, that is displayed on the workstation, in a way to help make the choice of what content to contract for. The contract is finalized via the workstation and a managing center (hereinafter referred to as "the center") is notified of the availability of the content, advertising and promotional material and the information describing is processed at the workstation in the central location and stored in the central database. The center via its workstation coordinates the delivery of the any previews associated with the content and advertising and promotional material with the owners to the center for storage at the center or elsewhere.

The attributes of the customer, the customers viewing system, the content available and the content the customer chooses to view are gathered via the following mechanisms:

The attributes of the customer are collected at the time the workstation, CineServer and other components are installed at the customer site. The attributes collected include metrics on the customer's site and audio capability and the customer's perceptual preferences, including color, sound, contrast, and other preferences important to the viewing experience of the customer. There are certainly other metrics that may be important but are not listed here. This information would be modified as a result of the on going collection of data on what the consumer actually viewed and what viewing experience for the content was chosen.

The attributes of the customer's viewing system are collected at the time the workstation, CineServer and other components are installed at the customer site. The attributes collected include metrics on the size and audio characteristics of the viewing room, those associated with the sound system and those associated with the performance of the display system. There are certainly other metrics that may be important but are not listed here.

The attributes of the content available are supplied by the content owners and include information (metrics, specifications, type of content/genre) needed to display the content in a way that delivers the customer preferred experience.

The attributes of the content the customer chooses to view are collected on a continual basis.

The content owners supply the attributes of the advertising and promotional content. These include the demographics and other metrics of the target customers of the content.

Through the analysis and use of the collected attributes and other data stored in the central database marketing and other experts in the center, using the workstation at the center, create and make available marketing plans and materials, sales plans and materials, content and advertising offering options on the exhibitor's workstation. The center's workstation also makes tools accessible via the exhibitor's workstation to help customize the options as the exhibitor sees fit.

The exhibitor uses the information and the tools accessible via the on site workstation to help market and sell to the customer and to construct and make available to the customer's control console in an easy to use form a customized offering consisting of a variety of content and advertising and promotional options tailored to the attributes of the individual customer. The exhibitor's offering to the customer is also stored in the center's database. The center's workstation, using the information on the exhibitors offering to the customer, schedules the delivery of previews of the content and advertising and promotional materials to the customer's control console.

The customer uses a control console to order and arrange for payment for a specific day and time of delivery, of the desired content and advertising and promotional material. The customer may also preview content including advertising before ordering on the control console or choose to view the preview on the customer viewing system. The customer can also enter with the content order whether advertising and promotional material is acceptable or not. The order is processed by the workstation at the center; the information is stored on the center's database. The information on the order is made available to the exhibitor on the exhibitor's workstation. This enables the exhibitor to complete the financial transactions with the customer, the content owners and the center's site. The center's workstation records the completion of the various financial transactions and schedules and triggers the delivery of the content, the advertising and promotional material and the Key Delivery Message.

Based on the customer's order and the requested day and time of delivery, the center prepares an encrypted content package including metadata on the specific customer that enables custom and preset viewing experiences, a recommended play list, anti piracy coding to enable tracking pirated content back to the individual home and generates the Key Delivery Message. The Key Delivery Message determines playback rights including date, number of plays etc. The center delivers the content package and the Key Delivery Message to the customer at the time requested and determined by the customer order. The delivery time and verification is recorded to the center database and is made available to the exhibitor's workstation. An alternative delivery mechanism would be the center delivering the content package and Key Delivery Message to the exhibitor. The exhibitor would then cut a DVD containing the content package and physically deliver it to the customer. The exhibitor would deliver the Key Delivery Message from the workstation to the consumers control console.

The content is delivered to the customer's CineServer while the Key Delivery Message is delivered separately to the customer's control console. Or alternatively the DVD from the exhibitor is entered into the CineServer. The control console and the CineServer along with various other components installed in the customers viewing system ensure the secure delivery and viewing of the content ordered by the customer. When the customer chooses to view the content a choice is made between the recommended play list and a customized play list that the customer creates on the control console. The customer also chooses the desired viewing experience from a set of options provided on the control console. The control console manages the customer's viewing system devices to deliver the play list and to provide the viewing experience chosen by the customer. The customer's control console sends an "Affidavit of Play" and data on the viewing experience chosen by the customer to the center for each piece of content, each time it is played. The center's workstation stores the "Affidavit of Play" and the customer viewing experience data in the center's database and makes it available to the exhibitor's, the content provider's, the center's and the advertising provider's workstations. Marketing experts use the data gathered on the customer's viewing habits to improve the recommended offerings for the customer in the future.

The exhibitor, the center, the content owners and advertising and promotional material providers based on the number of times the customer views the respective piece of content and the attributes of the customer, use the on site workstations and the tools supplied by the center to manage the financial transactions between them.

The customer's control console continuously monitors the viewing system's performance, adjusts the viewing system and/or sends a request with diagnostic information to a central device requesting remote or onsite service as necessary to maintain the proper viewing system performance.

The invention has been described in detail with particular reference to certain preferred embodiments thereof, but it will be understood that variations and modifications can be effected within the spirit and scope of the invention.

PARTS LIST

110 Conventional release cycle method
111 release for retail exhibition
112 release for DVD & VHS rentals
113 release for DVD sales
114 release for pay per view
115 release for broadcast television
120 Cuban release cycle method
121 release for retail exhibition
122 release for DVD & VHS rentals
123 release for DVD sales
124 release for pay per view
125 release for broadcast television
130 Alternative release cycle method 1
140 Alternative release cycle method 2
200 Remote Theater Exhibition System
210 Remote Theater Owner
220 Content Owner
230 Retail Exhibitor
240 Operations Center
250 Equipment Provider & Installation Services
300 Remote Theater System
310 Remote Theater Management System
311 Secure Server
312 Content Management System
320 Web Portal
330 Viewing System
331 Audio 332 Display
333 Environmental Control
400 Retail Exhibitor's Site
405 "Day & Date" Home Theater System
410 Web Portal
420 Content Manager
430 Movie Duplicator
440 Secure Server
500 Content Owner's System
505 Content Owner Site
510 Web Portal
520 Content Database
530 Content Manager
540 Secure Server
600 Operations Center
610 Customer Relationship Management (CRM)
611 Customer Order Management
612 Remote Theater Attribute Management
613 Customer Viewing Habits Database
614 Service Database
615 Web Portal
620 Digital Assets Manager
630 Key Management
700 Retail Exhibitor's System, Services, & Sales Procedure
710 Operation
711 Operation
712 Operation
713 Operation
714 Operation
715 Operation
716 Operation
800 Remote Theater Management System
810 Operation
811 Operation
812 Operation
813 Operation
814 Operation
815 Operation
900 Retail Exhibitor Contract Workflow
910 Operation
920 Operation
930 Operation
940 Operation
950 Operation
960 Operation
970 Operation
980 Operation
990 Operation
991 Operation
1000 Content Owner Workflow
1001 Operation
1002 Operation
1003 Operation
1004 Operation
1005 Operation
1006 Operation
1007 Operation
1008 Operation
1009 Operation
1010 Operation
1011 Operation
1012 Operation
1013 Operation
1014 Operation
1015 Operation
1016 Operation
1017 Operation
1018 Operation
1100 Retail Exhibitor Interaction Workflow
1110 Operation
1120 Operation
1130 Operation
1140 Operation
1150 Operation
1155 Operation
1160 Operation
1170 Operation
1180 Operation
1200 Customer (Home Theater Owner) Order Workflow
1210 Operation
1220 Operation
1225 Operation
1230 Operation
1240 Operation
1241 Operation
1250 Operation
1255 Operation
1260 Operation
1265 Operation
1270 Operation
1275 Operation
1280 Operation
1281 Operation
1300 Retail Exhibitor Processing Workflow
1310 Operation
1311 Operation
1320 Operation
1325 Operation
1300 Operation
1331 Operation
1332 Operation
1333 Operation
1334 Operation
1335 Operation
1336 Operation
1337 Operation
1338 Operation
1400 Playback & Billing Method
1410 Operation
1411 Operation
1412 Operation
1413 Operation
1414 Operation
1415 Operation
1417 Operation
1420 Operation
1422 Operation
1424 Operation
1426 Operation
1428 Operation
1430 Operation
1435 Operation
1440 Operation
1445 Operation
1450 Operation
1452 Operation
1459 Operation
1460 Operation
1465 Operation
1470 Operation
1471 Operation
1500 Remote Theater Service & Support Workflow
1510 Operation
1520 Operation 1530 Operation
1535 Operation
1540 Operation
1550 Operation
1560 Operation

The invention claimed is:

1. A method for delivering digital cinema concurrently to a retail exhibitor and a remote theater, comprising the steps of:
   a. forming a digital cinema right-to-distribute contract between a content owner and a retail exhibitor;
   b. forming a digital cinema movie rental contract between the retail exhibitor and a remote theater user;
   c. delivering newly released digital cinema content to the remote theater and to the retail exhibitor; and
   enabling display of the newly released digital cinema content at the remote theater as early as the display of the newly released digital cinema content at the retail exhibitor.

2. The method claimed in claim 1, wherein the retail exhibitor is a franchisee of a day and date remote theater digital cinema service provider.

3. The method claimed in claim 2, wherein the day and date remote theater digital cinema service provider provides services selected from the group consisting of key delivery messages, web content preview, day and date cinema order, day and date content delivery, back office billing and account management, and customer relationship management.

4. A system for delivering digital cinema concurrently to a retail exhibitor and a remote theater, comprising:
   a. a digital cinema content owner that owns and provides digital cinema content for retail distribution;
   b. a retail digital cinema exhibitor that receives the digital cinema content from the digital cinema content owner, whereupon the retail digital cinema exhibitor displays the digital cinema content to on-site retail customers and distributes the digital cinema content for remote use;
   c. a remote theater user that receives the digital cinema content from the retail digital cinema exhibitor for display on the remote theater user's audio/visual equipment; and
   d. an operations center for networking the digital cinema content owner and the retail digital cinema exhibitor together and also networking the retail digital cinema exhibitor with the remote theater user.

5. The system claimed in claim 4, wherein the operations center provides management of business transactions between the digital cinema content owner, the retail digital cinema exhibitor, and the remote theater user.

6. The system claimed in claim 4, wherein the operations center provides services selected from the group consisting of key delivery messages, web content preview, day & date cinema order, day & date content delivery, backoffice billing and account management, and customer relationship management.

7. The system claimed in claim 4 wherein the operations center includes:
   i. a database that aggregates customer data;
   ii. a security manager that provides digital assets management, key generation, and delivery of digital cinema content;
   iii. a back-office and billing system that coordinates financial and legal transactions between a retail exhibitor and a digital cinema content owner, and between the retail exhibitor and a remote theater user; and
   iv. application servers that provide portals for the financial and legal transactions involving the digital cinema content owner, the retail exhibitor, and the remote user.

8. The system claimed in claim 4, wherein a plurality of remote theater users are networked to the operations center.

9. A method for delivering digital cinema content concurrently to both a retail exhibitor and a remote theater for concurrent exhibition of the digital cinema content at both locales, comprising the steps of
   a. packaging digital cinema content for concurrent distribution to the retail exhibitor and the remote theater;
   b. providing the digital cinema content to a server at the retail exhibitor, wherein the retail exhibitor displays the digital cinema content at a retail exhibition location; and
   c. simultaneously delivering the digital cinema content to the remote theater, from the retail exhibitor's server, in response to a digital cinema content order selection from the remote theater over a communications network, wherein the remote theater displays the digital cinema content at a remote location as early as the date the retail exhibitor displays the digital cinema content at the retail exhibition location.

10. The method claimed in claim 9, wherein the step of packaging the digital cinema content is based on attributes and/or characteristics about the remote theater and/or a remote theater viewer.

11. The method claimed in claim 10, wherein the attributes about the remote theater are selected from the group consisting of projection-type, display-type, ambient lighting, audio system-type, viewer's content preference.

12. The method claimed in claim 9, wherein the retail exhibitor selects movie content, trailers, pre-show advertising, and movie shorts for distribution packages that a viewer, at the remote theater, selectively chooses for viewing.

* * * * *